(12) United States Patent
Kawata et al.

(10) Patent No.: US 10,351,937 B2
(45) Date of Patent: Jul. 16, 2019

(54) HIGH-STRENGTH STEEL SHEET EXCELLENT IN IMPACT RESISTANCE AND MANUFACTURING METHOD THEREOF, AND HIGH-STRENGTH GALVANIZED STEEL SHEET AND MANUFACTURING METHOD THEREOF

(75) Inventors: Hiroyuki Kawata, Tokyo (JP); Naoki Maruyama, Tokyo (JP); Akinobu Murasato, Tokyo (JP); Akinobu Minami, Tokyo (JP); Hajime Hasegawa, Tokyo (JP); Chisato Wakabayashi, Tokyo (JP); Tsuyoshi Oki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 383 days.

(21) Appl. No.: 14/235,414

(22) PCT Filed: Jul. 27, 2012

(86) PCT No.: PCT/JP2012/069261
§ 371 (c)(1),
(2), (4) Date: Mar. 13, 2014

(87) PCT Pub. No.: WO2013/018740
PCT Pub. Date: Feb. 7, 2013

(65) Prior Publication Data
US 2014/0205855 A1 Jul. 24, 2014

(30) Foreign Application Priority Data

Jul. 29, 2011 (JP) .................................. 2011-167661

(51) Int. Cl.
| | |
|---|---|
| C22C 38/38 | (2006.01) |
| C22C 38/34 | (2006.01) |
| C22C 38/28 | (2006.01) |
| C22C 38/22 | (2006.01) |
| C22C 38/16 | (2006.01) |
| C22C 38/14 | (2006.01) |
| C22C 38/12 | (2006.01) |
| C22C 38/08 | (2006.01) |
| C22C 38/06 | (2006.01) |
| C22C 38/04 | (2006.01) |
| C22C 38/02 | (2006.01) |
| C22C 38/00 | (2006.01) |
| C25D 5/48 | (2006.01) |
| C23C 2/02 | (2006.01) |
| C23C 2/06 | (2006.01) |
| C23C 2/28 | (2006.01) |
| C21D 8/02 | (2006.01) |

(Continued)

(52) U.S. Cl.
CPC ............ *C22C 38/38* (2013.01); *B32B 15/013* (2013.01); *C21D 8/0247* (2013.01); *C22C 18/00* (2013.01); *C22C 18/04* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/28* (2013.01); *C22C 38/34* (2013.01); *C23C 2/02* (2013.01); *C23C 2/06* (2013.01); *C23C 2/28* (2013.01); *C25D 5/36* (2013.01); *C25D 5/48* (2013.01); *C25D 7/0614* (2013.01); *Y10T 428/12611* (2015.01); *Y10T 428/12799* (2015.01)

(58) Field of Classification Search
None
See application file for complete search history.

(56) References Cited

U.S. PATENT DOCUMENTS

| | | | | |
|---|---|---|---|---|
| 2007/0071997 A1* | 3/2007 | Goto | ........................ | C22C 38/02 |
| | | | | 428/659 |
| 2011/0008647 A1 | 1/2011 | Azuma et al. | | |

(Continued)

FOREIGN PATENT DOCUMENTS

| | | |
|---|---|---|
| CA | 2781815 A1 | 6/2011 |
| JP | 10-130776 A | 5/1998 |

(Continued)

OTHER PUBLICATIONS

KR 1020020068529 machine translation.*

(Continued)

*Primary Examiner* — Paul A Wartalowicz
*Assistant Examiner* — Stephani Hill
(74) *Attorney, Agent, or Firm* — Birch, Stewart, Kolasch & Birch, LLP

(57) ABSTRACT

The present invention provides a high-strength steel sheet excellent in impact resistance. The high-strength steel sheet contains predetermined contents of C, Si, Mn, P, S, Al, Ti, N, and O, with the balance being iron and inevitable impurities, and has a steel sheet structure in which, in a $\frac{1}{8}$ thickness to $\frac{3}{8}$ thickness region across $\frac{1}{4}$ of a sheet thickness, 1 to 8% retained austenite is contained in volume fraction, an average aspect ratio of the retained austenite is 2.0 or less, an amount of solid-solution Mn in the retained austenite is 1.1 times an average amount of Mn or more, and TiN grains having a 0.5 μm average grain diameter or less are contained, and a density of AlN grains with a 1 μm grain diameter or more is 1.0 pieces/mm² or less, wherein a maximum tensile strength is 900 MPa or more.

12 Claims, No Drawings

(51) Int. Cl.
*C25D 5/36* (2006.01)
*C22C 18/00* (2006.01)
*C22C 18/04* (2006.01)
*B32B 15/01* (2006.01)
*C25D 7/06* (2006.01)

(56) References Cited

U.S. PATENT DOCUMENTS

| | | | | |
|---|---|---|---|---|
| 2011/0139315 | A1* | 6/2011 | Nakagaito | C21D 1/25 |
| | | | | 148/533 |
| 2012/0222781 | A1 | 9/2012 | Azuma et al. | |

FOREIGN PATENT DOCUMENTS

| | | | | | |
|---|---|---|---|---|---|
| JP | 11-21653 | A | | 1/1999 | |
| JP | 2001-11565 | A | | 1/2001 | |
| JP | 2001198604 | A | * | 7/2001 | ............... B21B 1/26 |
| JP | 2001329340 | A | * | 11/2001 | ............... B21B 1/26 |
| JP | 2002-294400 | A | | 10/2002 | |
| JP | 2004244665 | A | * | 9/2004 | ............. C22C 38/00 |
| JP | 2004-300452 | A | | 10/2004 | |
| JP | 2006-307327 | A | | 11/2006 | |
| JP | 2007321233 | A | * | 12/2007 | ............... C21D 1/25 |
| JP | 2008-274355 | A | | 11/2008 | |
| JP | 2009-68039 | A | | 4/2009 | |
| JP | WO 2009096344 | A1 | * | 8/2009 | ............... C21D 1/25 |
| JP | 2010-202949 | A | | 9/2010 | |
| JP | 2011-111672 | A | | 6/2011 | |
| JP | 2012-172203 | A | | 9/2012 | |
| KR | 10-2002-0068529 | A | | 8/2002 | |
| KR | 10-2010-0112657 | A | | 10/2010 | |
| TW | 2009329925 | A | | 8/2009 | |
| WO | WO 01/34874 | A1 | | 5/2001 | |
| WO | WO 2009/072559 | A1 | | 6/2009 | |
| WO | WO 2011/065591 | A1 | | 6/2011 | |

OTHER PUBLICATIONS

JP 2001-198604 machine translation.*
JP 2004-244665 machine translation.*
JP 2001-329340 machine translation (Year: 2001).*
JP 2007-321233 machine translation (Year: 2007).*
Krauss, "Microstructures, Processing, and Properties of Steel." ASM Handbook, vol. 1, ASM International 1990, p. 126-139. (Year: 1990).*
Korean Office Action, dated Jul. 14, 2015, for Korean Application No. 10-2014-7003703, together with an English translation thereof.
Taiwanese Office Action dated Jul. 24, 2014, issued in Taiwanese Patent Application No. 101127433.
Extended European Search Report for European Application No. 12820097.9, dated Mar. 6, 2015.
International Search Report for PCT/JP2012/069261, dated Oct. 30, 2012.
Written Opinion of the International Searching Authority for PCT/JP2012/069261, dated Oct. 30, 2012.
Brazilian Search Report and Technical Examination Report, published in the Brazilian Industrial Property Journal No. 2484, dated Aug. 14, 2018, for Brazilian Application No. BR112014002023-0, with English translations.
Indian Office Action dated Jan. 17, 2019, for corresponding Indian Patent Application No. 1253/DELNP/2014, with English translation.

* cited by examiner

HIGH-STRENGTH STEEL SHEET EXCELLENT IN IMPACT RESISTANCE AND MANUFACTURING METHOD THEREOF, AND HIGH-STRENGTH GALVANIZED STEEL SHEET AND MANUFACTURING METHOD THEREOF

TECHNICAL FIELD

The present invention relates to a high-strength steel sheet and a manufacturing method thereof, and a high-strength galvanized steel sheet and a manufacturing method thereof, and more particularly to a high-strength steel sheet having excellent impact resistance and a manufacturing method thereof. This application is based upon and claims the benefit of priority of the prior Japanese Patent Application No. 2011-167661, filed on Jul. 29, 2011, the entire contents of which are incorporated herein by reference.

BACKGROUND ART

In recent years, there has been a demand not only for improvement in strength of steel sheets used in automobiles but also for improvement in impact resistance thereof, in order to enhance collision safety while realizing a weight reduction of automobiles.

As a high-strength steel sheet having large collision absorbing energy, Patent Document 1 describes a high-strength steel sheet containing, in weight %, C: 0.05 to 0.3%, Si: 2.0% or less, Al: 0.01 to 2.0%, Mn: 0.5 to 4.0%, Ni: 0 to 5.0%, P: 0.1% or less, S: 0.1% or less, and N: 0.01% or less, with the balance being Fe and inevitable impurities, and having a chemical composition satisfying $1.5-3.0 \times C \leq Si+Al \leq 3.5-5.0 \times C$ and $Mn+(Ni/3) \geq 1.0(\%)$, wherein a bake hardening amount of the steel sheet is 50 MPa or more.

Further, as a high-tension steel sheet excellent in collision absorbency, Patent Document 2 describes a high-ductility, high-tension steel sheet which has a steel structure including: bainite having a volume fraction VB given by an expression $VB \leq (TSs/60)-1$ (TSs: tensile strength (MPa) in a static tensile test); and retained austenite whose C content is 1.2 mass % or less and whose volume fraction is 5% or more, with the balance being ferrite, wherein a yield ratio in the static tensile test is 0.6 or more, and a static-dynamic ratio of the steel sheet is high, with a ratio TSd/TSs between tensile strength in a dynamic tensile test and tensile strength in the static tensile test satisfying a relation given by an expression $TSd/TSs \geq 0.8+(300/TSs)$ (Tsd: the tensile strength (MPa) in the dynamic tensile test at a 1000/s strain rate).

Further, as a method of manufacturing a high-strength cold-rolled steel sheet excellent in impact property, Patent Document 3 describes a manufacturing method including: hot-rolling a slab which has a composition containing C: 0.08 to 0.18 mass %, Si: 1.00 to 2.0 mass %, Mn: 1.5 to 3.0 mass %, P: 0.03 mass % or less, S: 0.005% mass % or less, and T.Al: 0.01 to 0.1 mass % and in which a Mn segregation degree defined by an expression (Mn segregation degree=(a Mn concentration at a center portion of the slab–a Mn concentration at a base)/the Mn concentration at the base) is 1.05 to 1.10; after cold-rolling, performing heating in a two-phase region or a single-phase region of 750 to 870° C. for a 60 second retention time or longer on a continuous annealing line; thereafter, after cooling in a 720 to 600° C. temperature region at a 10° C./s average cooling rate or less, performing cooling to 350 to 460° C. at a 10° C./s average cooling rate or more to keep this temperature for 30 seconds to 20 minutes, and thereafter performing cooling to room temperature to produce a five-phase structure of polygonal ferrite+acicular ferrite+bainite+retained austenite+martensite.

As a steel sheet used as a steel sheet for automobiles, Patent Document 4 describes an alloyed hot-dip galvanized steel sheet containing, in mass %, C: 0.05 to 0.25%, Si: 0.5% or less, Mn: 1 to 3%, P: 0.1% or less, S: 0.01% or less, Al: 0.1 to 2%, and N: less than 0.005%, with the balance being Fe and inevitable impurities, wherein $Si+Al \geq 0.6\%$, $(0.0006Al) \% \leq N \leq 0.0058\%-(0.0026 \times Al) \%$, and $Al \leq (1.25 \times C^{0.5}-0.57 Si+0.625 Mn) \%$ are satisfied.

As a high-strength alloyed hot-dip galvanized steel sheet excellent in energy absorbency, Patent Document 5 describes one whose base material is a steel sheet having: a component composition containing C: 0.05 to 0.20 mass %, Si: 0.3 to 1.5 mass %, Mn: 1.0 to 2.5 mass %, and P: 0.1 mass % or less, with the balance being Fe and inevitable impurities; and a microstructure containing one or two out of martensite and retained austenite totally in 25 to 50 vol %, with the balance being ferrite and bainite, wherein alloying hot-dip galvanization is applied to both surfaces of the steel sheet.

As a high-ductility, high-tension cold-rolled steel sheet excellent in surface property and impact absorbency, Patent Document 6 describes one containing, in weight ratio, C: 0.06 to 0.25%, Si: 2.5% or less, Mn: 0.5 to 3.0%, P: 0.1% or less, S: 0.03% or less, Al: 0.1 to 2.5%, Ti: 0.003 to 0.08%, and N: 0.01% or less, with the balance being Fe and inevitable impurities, wherein a Ti content satisfies a relation of $(48/14)N \leq Ti \leq (48/14)N+(48/32)S+0.01$, and a structure after cold rolling-recrystallization annealing is a structure containing 5% retained austenite or more in volume fraction.

As a high-ductility, high-strength steel sheet excellent in low-temperature toughness, Patent Document 7 describes one having a structure which contains, in area %, 60% bainite or more and 1 to 20% retained γ, with the balance being substantially ferrite, wherein the retained γ exists in a grain of the bainite.

PRIOR ART DOCUMENT

Patent Document

Patent Document 1: Japanese Laid-open Patent Publication No. 2001-11565
Patent Document 2: Japanese Laid-open Patent Publication No. 2002-294400
Patent Document 3: Japanese Laid-open Patent Publication No. 2004-300452
Patent Document 4: Japanese Laid-open Patent Publication No. 2006-307327
Patent Document 5: Japanese Laid-open Patent Publication No. 2009-68039
Patent Document 6: Japanese Laid-open Patent Publication No. H10-130776
Patent Document 7: Japanese Laid-open Patent Publication No. H11-21653

DISCLOSURE OF THE INVENTION

Problems to be Solved by the Invention

However, in the conventional arts, it is not possible to obtain sufficient impact resistance in a high-strength steel sheet having 900 MPa maximum tensile strength or more, and there has been a demand for a further improvement in impact resistance.

In view of the above-described circumstances, the present invention provides a high-strength steel sheet having excellent impact resistance and a manufacturing method thereof, and a high-strength galvanized steel sheet in which a galvanized layer is formed on a surface of a high-strength steel sheet excellent in impact resistance and a manufacturing method thereof.

Means for Solving the Problems

The present inventors repeated studious studies for obtaining a high-strength steel sheet whose maximum tensile strength is 900 MPa or more with which excellent impact resistance is obtained. As a result, the present inventors have found out that it is necessary that a steel sheet has a predetermined chemical composition containing Al: 0.001 to 0.050%, Ti: 0.0010 to 0.0150%, and N: 0.0001 to 0.0050%, and in a ⅛ thickness to ⅜ thickness region across ¼ of a sheet thickness, a steel sheet structure contains 1 to 8% retained austenite in volume fraction, an average aspect ratio of the retained austenite is 2.0 or less, an amount of solid-solution Mn in the retained austenite is 1.1 times an average amount of Mn or more, TiN grains with a 0.5 μm average grain diameter or less are contained, and a density of AlN grains with a 1 μm grain diameter or more is 1.0 pieces/mm² or less.

That is, the above-described high-strength steel sheet is one which contains Al, Ti, and N in the aforesaid ranges and in which the generation of the AlN grains with an 1 μm average grain diameter or more which become starting points of destruction at low temperatures is suppressed by the generation of the fine TiN grains with a 0.5 μm grains diameter or less, and therefore, the density of the AlN grains with a 1 μM grain diameter or more is low, that is, 1.0 pieces/mm² or less. Therefore, in the above-described high-strength steel sheet, destruction starting from the AlN grains is prevented.

Further, in the above-described high-strength steel sheet, the volume fraction of the retained austenite which become the starting points of the destruction is 1 to 8% and thus is small, the retained austenite has a stable shape excellent in isotropy, with the average aspect ratio being 2.0 or less, and the retained austenite is chemically stable, with an amount of the solid-solution Mn in the retained austenite being 1.1 times the average amount of Mn or more. Therefore, in the above-described high-strength steel sheet, destruction starting from the retained austenite is prevented.

As described above, in the above-described high-strength steel sheet, since the destruction starting from the AlN grains and the destruction starting from the retained austenite are prevented, it is possible to obtain excellent impact resistance.

The present invention was completed based on such findings, and its gist is as follows.

(1)
A high-strength steel sheet excellent in impact resistance containing, in mass %, C: 0.075 to 0.300%, Si: 0.30 to 2.50%, Mn: 1.30 to 3.50%, P: 0.001 to 0.050%, S: 0.0001 to 0.0050%, Al: 0.001 to 0.050%, Ti: 0.0010 to 0.0150%, N: 0.0001 to 0.0050%, and O: 0.0001 to 0.0030%, with the balance being iron and inevitable impurities, and having a steel sheet structure in which, in a ⅛ thickness to ⅜ thickness region across ¼ of a sheet thickness, 1 to 8% retained austenite is contained in volume fraction, an average aspect ratio of the retained austenite is 2.0 or less, an amount of solid-solution Mn in the retained austenite is 1.1 times an average amount of Mn or more, TiN grains having a 0.5 μm average grain diameter or less are contained, and a density of AlN grains with a 1 μm grain diameter or more is 1.0 pieces/mm² or less, wherein maximum tensile strength is 900 MPa or more.

(2)
The high-strength steel sheet excellent in impact resistance according to (1), wherein the steel sheet structure contains, in volume fraction, 10 to 75% ferrite, one of or both of bainitic ferrite and bainite totally in 10 to 50%, and 10 to 50% tempered martensite, and
wherein pearlite is limited to 5% or less in volume fraction, and fresh martensite is limited to 15% or less in volume fraction.

(3)
The high-strength steel sheet excellent in impact resistance according to (1), further containing, in mass %, one or two or more of Nb: 0.0010 to 0.0150%, V: 0.010 to 0.150%, and B: 0.0001 to 0.0100%.

(4)
The high-strength steel sheet excellent in impact resistance according to (1), further containing, in mass %, one or two or more of Cr: 0.01 to 2.00%, Ni: 0.01 to 2.00%, Cu: 0.01 to 2.00%, Mo: 0.01 to 1.00%, and W: 0.01 to 1.00%.

(5)
The high-strength steel sheet excellent in impact resistance according to (1), further containing one or two or more of Ca, Ce, Mg, Zr, Hf, and REM totally in 0.0001 to 0.5000 mass %.

(6)
The high-strength galvanized steel sheet excellent in impact resistance according to (1), wherein a galvanized layer is formed on a surface.

(7)
The high-strength galvanized steel sheet excellent in impact resistance according to (6), wherein a coating film made of a phosphorus oxide and/or a composite oxide containing phosphorus is formed on the surface of the galvanized layer.

(8)
A manufacturing method of a high-strength steel sheet excellent in impact resistance, the method including: a hot-rolling step in which a slab containing, in mass %, C: 0.075 to 0.300%, Si: 0.30 to 2.50%, Mn: 1.30 to 3.50%, P: 0.001 to 0.050%, S: 0.0001 to 0.0050%, Al: 0.001 to 0.050%, Ti: 0.0010 to 0.0150%, N: 0.0001 to 0.0050%, and O: 0.0001 to 0.0030%, with the balance being iron and inevitable impurities is heated to 1210° C. or higher, reduction is performed under a condition satisfying the following (Expression 1) at least in a temperature range of 1100 to 1000° C., the reduction is finished at a finish hot-rolling temperature that is not lower than a higher temperature of 800° C. and an Ar₃ transformation point nor higher than 970° C., coiling is performed in a temperature region of 750° C. or lower, and cooling is performed at an average cooling rate of 15° C./hour or less; a cold-rolling step in which cold-rolling is performed at a reduction ratio of 30 to 75% after the hot-rolling step; and a continuous annealing step of performing, after the cold-rolling step, annealing where heating is performed in a temperature range of 550 to 700° C. at an average heating rate of 10° C./second or less, a maximum heating temperature is set to a temperature between (an Ac₁ transformation point+40) and 1000° C., cooling is performed in a temperature range of the maximum heating temperature to 700° C. at an average cooling rate of 1.0 to 10.0° C./second, cooling is performed in a temperature range of 700 to 500° C. at an average cooling rate of 5.0 to 200.0° C./second, and a retention process is performed in a temperature range of 350 to 450° C. for 30 to 1000 seconds.

[Numerical Expression 1]

$$1.0 \leq \left\{ \sum_{i=1}^{n} \left[ \left\{ \frac{-97.2 + 5.47 \cdot (T_{i+1} + T_i)^{1/2} - }{0.067 \cdot (T_{i+1} + T_i)} \right\}^2 \cdot \exp\left(-\frac{20800}{T_{i+1} + T_i}\right) \cdot t_i \cdot \varepsilon_i^{1/2} \right]^{1/2} \right\} \leq 5.0 \quad \text{(Expression 1)}$$

In (Expression 1), i represents the number of passes, $T_i$ represents a working temperature of the $i^{th}$ pass, $t_i$ represents an elapsed time from the $i^{th}$ pass to the $i+1^{th}$ pass, and $\varepsilon_i$ represents a reduction ratio of the $i^{th}$ pass.

(9)
A method of manufacturing a high-strength galvanized steel sheet excellent in impact resistance, wherein, in the continuous annealing step of the manufacturing method according to (8), a galvanized layer is formed on a surface of the steel sheet by applying electrogalvanization after the retention process.

(10)
A manufacturing method of a high-strength galvanized steel sheet excellent in impact resistance, wherein, in the continuous annealing step of the manufacturing method according to (8), after the cooling in the temperature range of 700 to 500° C., the steel sheet is immersed in a galvanizing bath to form a galvanized layer on a surface of the steel sheet before the retention process in the temperature range of 350 to 450° C. or after the retention process.

(11)
The manufacturing method of the high-strength galvanized steel sheet excellent in impact resistance according to (10), wherein, after immersed in the galvanizing bath, the steel sheet is re-heated to 460 to 600° C. and is retained for two seconds or longer to alloy the galvanized layer.

(12)
The manufacturing method of the high-strength galvanized steel sheet excellent in impact resistance according to (10), wherein, after the galvanized layer is formed, a coating film made of a phosphorus oxide and/or a composite oxide containing phosphorus is applied on a surface of the galvanized layer.

(13)
The manufacturing method of the high-strength galvanized steel sheet excellent in impact resistance according to (11), wherein, after the galvanized layer is alloyed, a coating film made of a phosphorus oxide and/or a composite oxide containing phosphorus is applied on a surface of the alloyed galvanized layer.

Effect of the Invention

In the high-strength steel sheet of the present invention, since the AlN grains and the retained austenite are prevented from working as starting points of destruction, it is possible to obtain a high-strength steel sheet having excellent impact resistance and having a maximum tensile strength of 900 MPa or more. Further, according to the manufacturing method of the high-strength steel sheet of the present invention, it is possible to provide a high-strength steel sheet having excellent impact resistance and having maximum tensile strength of 900 MPa or more. Further, according to the present invention, it is possible to provide a high-strength galvanized steel sheet in which a galvanized layer is formed on a surface of a high-strength steel sheet excellent in impact resistance and a manufacturing method thereof.

BEST MODE FOR CARRYING OUT THE INVENTION (Chemical Components)
First, chemical components (composition) of the high-strength steel sheet of the present invention will be described. Note that [%] in the following description represents [mass %].

The high-strength steel sheet of the present invention contains C: 0.075 to 0.300%, Si: 0.30 to 2.50%, Mn: 1.30 to 3.50%, P: 0.001 to 0.050%, S: 0.0001 to 0.0050%, Al: 0.001 to 0.050%, Ti: 0.0010 to 0.0150%, N: 0.0001 to 0.0050%, and O: 0.0001 to 0.0030%, with the balance being iron and inevitable impurities.

"C: 0.075 to 0.300%"
C is contained in order to increase strength of the high-strength steel sheet. However, when the content of C is over 0.300%, weldability becomes insufficient. In view of weldability, the content of C is preferably 0.250% or less, and more preferably 0.220% or less. On the other hand, when the content of C is less than 0.075%, strength lowers and it is not possible to ensure maximum tensile strength of 900 MPa or more. In order to increase strength, the content of C is preferably 0.090% or more, and more preferably 0.100% or more.

"Si: 0.30 to 2.50%"
Si is an element necessary for suppressing the generation of an iron-based carbide in the steel sheet and for increasing strength and formability. However, when the content of Si is over 2.50%, the steel sheet becomes brittle, so that its ductility deteriorates. In view of ductility, the content of Si is preferably 2.20% or less, and more preferably 2.00% or less. On the other hand, when the content of Si is less than 0.30%, a large amount of a coarse iron-based carbide is generated in an annealing step, resulting in deterioration in strength and formability. From this point of view, a lower limit value of Si is preferably 0.50% or more, and more preferably 0.70% or more.

"Mn: 1.30 to 3.50%"
Mn is added to the steel sheet of the present invention in order to increase strength of the steel sheet. However, when the content of Mn is over 3.50%, a coarse Mn concentrated portion is generated in a thickness center portion of the steel sheet, which is likely to cause embrittlement and to cause a trouble such as cracking of a cast slab. Further, when the content of Mn is over 3.50%, weldability also deteriorates. Therefore, the content of Mn needs to be 3.50% or less. In view of weldability, the content of Mn is preferably 3.20% or less, and more preferably 3.00% or less. On the other hand, when the content of Mn is less than 1.30%, a large amount of a soft structure is formed during cooling after the annealing, which makes it difficult to ensure the maximum tensile strength of 900 MPa or more. Therefore, the content of Mn needs to be 1.30% or more. In order to increase strength, the content of Mn is preferably 1.50% or more, and more preferably 1.70% or more.

"P: 0.001 to 0.050%"
P tends to segregate in the thickness center portion of the steel sheet and makes a welded portion brittle. When the content of P is over 0.050%, the welded portion is greatly made brittle, and therefore, the content of P is limited to 0.050% or less. The effects of the present invention are exhibited without particularly setting a lower limit of the content of P, but setting the content of P to less than 0.001% is accompanied by a great increase in manufacturing cost, and therefore, 0.001% is set as the lower limit value.

"S: 0.0001 to 0.0050%"

S has an adverse effect on weldability and manufacturability at the time of casting and at the time of hot-rolling. Further, S coupled with Ti generates a sulfide to prevent Ti from becoming a nitride and to indirectly induce the generation of an Al nitride, and therefore, an upper limit value of the content of S is set to 0.0050%. From this point of view, the content of S is preferably 0.035% or less, and more preferably 0.0025% or less. The effects of the present invention are exhibited without particularly limiting the lower limit of the content of S, but setting the content of S to less than 0.0001% is accompanied by a great increase in manufacturing cost, and therefore, 0.0001% is set as the lower limit value.

"Al: 0.001% to 0.050%"

Al, when added in large amount, forms a coarse nitride to lower a drawing value at low temperatures and to deteriorate impact resistance, and therefore, an upper limit of the content of Al is set to 0.050%. In order to avoid the generation of the coarse nitride, the content of Al is preferably 0.035% or less. The effects of the present invention are exhibited without particularly setting a lower limit of the content of Al, but setting the content of Al to less than 0.001% is accompanied by a great increase in manufacturing cost, and therefore, 0.001% is set as the lower limit value. Further, Al is an effective element as a deoxidizing material, and from this point of view, the content of Al is preferably 0.005% or more, and more preferably 0.010% or more.

"N: 0.0001 to 0.0050%"

Since N forms a coarse nitride working as a starting point of destruction at low temperatures and deteriorates impact resistance, its addition amount needs to be reduced. When the content of N is over 0.0050%, this influence becomes prominent, and therefore, a range of the content of N is set to 0.0050% or less. From this point of view, the content of N is preferably 0.0040% or less, and more preferably 0.0030% or less. The effects of the present invention are exhibited without particularly setting a lower limit of the content of N, but setting the content of N to less than 0.0001% causes a great increase in manufacturing cost, and therefore, 0.0001% is set as the lower limit value.

"O: 0.0001 to 0.0030%"

Since O forms a coarse oxide and generates a starting point of destruction at low temperatures, its content needs to be reduced. When the content of O is over 0.0030%, this influence becomes prominent, and therefore, an upper limit of the content of O is set to 0.0030% or less. From this point of view, the content of O is preferably 0.0020% or less, and more preferably 0.0010% or less. The effects of the present invention are exhibited without particularly setting a lower limit of the content of 0, but setting the content of O to less than 0.0001% is accompanied by a great increase in manufacturing cost, and therefore, 0.0001% is set as the lower limit.

"Ti: 0.0010 to 0.0150%"

Ti is an element that forms a fine nitride as a result of hot-rolling under an appropriate condition and suppresses the generation of the coarse Al nitride, and it reduces the starting points of destruction at low temperatures and improves impact resistance. In order to obtain this effect, the content of Ti needs to be 0.0010% or more, and the content of Ti is preferably 0.0030% or more, and more preferably 0.0050% or more. On the other hand, when the content of Ti is over 0.0150%, formability of a soft portion in the steel sheet deteriorates due to the segregation of a fine carbonitride, which lowers a drawing value at low temperatures, instead. Therefore, the content of Ti is set to 0.0150% or less. In view of formability, the content of Ti is preferably 0.0120% or less, and more preferably 0.0100% or less.

The high-strength steel sheet of the present invention may further contain the following elements when necessary.

"Nb: 0.0010 to 0.0150%"

Nb is an element that forms a fine nitride as a result of applying the hot-rolling under an appropriate condition and suppresses the generation of the coarse Al nitride, and it reduces the starting points of destruction at low temperatures. In order to obtain this effect, the content of Nb is preferably 0.0010% or more, and the content of Nb is more preferably 0.0030% or more, and still more preferably 0.0050% or more. On the other hand, when the content of Nb is over 0.0150%, formability of the soft portion in the steel sheet deteriorates due to the segregation of a fine carbonitride, which lowers the drawing value at low temperatures, instead, and therefore, the content of Nb is preferably 0.0150% or less. In view of formability, the content of Nb is more preferably 0.0120% or less, and still more preferably 0.0100% or less.

"V: 0.010 to 0.150%"

V is an element that forms a fine nitride as a result of applying the hot rolling under an appropriate condition and suppresses the generation of the coarse Al nitride, and reduces the starting points of destruction at low temperatures. In order to obtain this effect, the content of V needs to be 0.010% or more, and its content is preferably 0.030% or more, and more preferably 0.050% or more. On the other hand, when the content of V is over 0.150%, formability of the soft portion in the steel sheet deteriorates due to the segregation of a fine carbonitride, which lowers the drawing value at low temperatures, instead, and therefore, the content of V is preferably 0.150% or less. In view of formability, the content of V is more preferably 0.120% or less, and still more preferably 0.100% or less.

"B: 0.0001 to 0.0100%"

B is an element that forms a fine nitride as a result of applying the hot rolling under an appropriate condition and suppresses the generation of the coarse Al nitride, and reduces the starting points of destruction at low temperatures. In order to obtain this effect, the content of B is preferably 0.0001% or more, and the content of B is preferably 0.0003% or more, and more preferably 0.0005% or more. Further, B is an element that suppresses phase transformation at high temperatures and that is effective for increasing strength, and may be added more, but when the content of B is over 0.0100%, workability in the hot working is impaired, leading to deterioration in productivity, and therefore, the content of B is preferably 0.0100% or less. In view of productivity, the content of B is more preferably 0.0050% or less, and still more preferably 0.0030% or less.

"Cr: 0.01 to 2.00%"

Cr is an element that suppresses the phase transformation at high temperatures and is effective for increasing strength, and may be added instead of part of C and/or Mn. When the content of Cr is over 2.00%, workability in the hot working is impaired, leading to deterioration in productivity, and therefore, the content of Cr is preferably 2.00% or less. The effects of the present invention are exhibited without particularly setting a lower limit of the content of Cr, but in order to sufficiently obtain the effect of increasing strength by Cr, the content of Cr is preferably 0.01% or more.

"Ni: 0.01 to 2.00%"

Ni is an element that suppresses the phase transformation at high temperatures and is effective for increasing strength, and may be added instead of part of C and/or Mn. When the content of Ni is over 2.00%, weldability is impaired, and therefore, the content of Ni is preferably 2.00% or less. The effects of the present invention are exhibited without particularly setting a lower limit of the content of Ni, but in order to sufficiently obtain the effect of increasing strength by Ni, the content of Ni is preferably 0.01% or more.

"Cu: 0.01 to 2.00%"

Cu is an element that increases strength when existing in steel as fine grains, and may be added instead of part of C and/or Mn. When the content of Cu is over 2.00%, weldability is impaired, and therefore, the content of Cu is preferably 2.00% or less. The effects of the present invention are exhibited without particularly setting a lower limit of the content of Cu, but in order to sufficiently obtain the effect of increasing strength by Cu, the content of Cu is preferably 0.01% or more.

"Mo: 0.01 to 1.00%"

Mo is an element that suppresses the phase transformation at high temperatures and is effective for increasing strength, and may be added instead of part of C and/or Mn. When the content of Mo is over 1.00%, workability in the hot working is impaired, leading to deterioration in productivity. Therefore, the content of Mo is preferably 1.00% or less. The effects of the present invention are exhibited without particularly setting a lower limit of the content of Mo, but in order to sufficiently obtain the effect of increasing strength by Mo, the content of Mo is preferably 0.01% or more.

"W: 0.01 to 1.00%"

W is an element that suppresses the phase transformation at high temperatures and is effective for increasing strength, and may be added instead of part of C and/or Mn. When the content of W is over 1.00%, workability in the hot working is impaired, leading to deterioration in productivity, and therefore, the content of W is preferably 1.00% or less. The effects of the present invention are exhibited without particularly setting a lower limit of the content of W, but in order to sufficiently obtain the effect of increasing strength by W, the content of W is preferably 0.01% or more.

"One or two or more of Ca, Ce, Mg, Zr, Hf, and REM totally in 0.0001 to 0.5000%"

Ca, Ce, Mg, Zr, Hf, and REM are elements effective for improving formability, and one or two or more thereof can be added. However, when the total content of one or two or more of Ca, Ce, Mg, Zr, Hf, and REM is over 0.5000%, ductility is liable to be lost, instead. Therefore, the total content of the elements is preferably 0.5000% or less. The effects of the present invention are exhibited without particularly setting a lower limit of the content of one or two or more of Ca, Ce, Mg, Zr, Hf, and REM, but in order to sufficiently obtain the effect of improving formability of the steel sheet, the total content of the elements is preferably 0.0001% or more. In view of formability, the total content of one or two or more of Ca, Ce, Mg, Zr, Hf, and REM is more preferably 0.0005% or more, and still more preferably 0.0010% or more.

Note that REM stands for Rare Earth Metal and refers to an element belonging to a lanthanoid series. In the present invention, REM and Ce are often added as misch metal, and elements of the lanthanoid series are sometimes contained in a complex form in addition to La and Ce. Even when an element of the lanthanoid series other than these La and Ce is contained as inevitable impurities, the effects of the present invention are exhibited. Even when the metals La and Ce are added, the effects of the present invention are exhibited.

(Steel Sheet Structure)

A reason why the structure of the high-strength steel sheet of the present invention is stipulated is as follows.

"TiN Grains"

A steel sheet structure of the high-strength steel sheet of the present invention contains TiN grains having a 0.5 µm average grain diameter or less. Coarse TiN grains work as the starting points of destruction, but the fine TiN grains whose average grain diameter is 0.5 µm or less do not work as the starting points of the destruction. The average grain diameter of the TiN grains is preferably 0.3 µm or less, and more preferably 0.1 µm or less in order to effectively prevent the TiN grains from working as the starting points of destruction and to further improve impact resistance of the high-strength steel sheet.

The average grain diameter of the TiN grains is found by the following method, for instance.

Specifically, a sample for transmission electron microscope (TEM) containing TiN grains is prepared from a thicknesswise cross section parallel to a rolling direction by an extraction replica method, and 10 pieces or more of the TiN grains are observed by using a transmission electron microscope. A grain diameter of each of the TiN grains is defined as a diameter of a circle having an area equal to a projected area of the TiN grain obtained by image analysis. Then, the grain diameters of the 10 pieces or more of the TiN grains are measured, and from an average value thereof, the average grain diameter of the TiN grains is found.

"AlN Grains"

Further, in the steel sheet structure of the high-strength steel sheet of the present invention, a density of AlN grains having a 1 µm grain diameter or more is 1.0 pieces/mm$^2$ or less. The coarse AlN grains having a 1 µm grain diameter or more work as the starting points of destruction. In the steel sheet structure of the high-strength steel sheet of the present invention, since the density of the AlN grains having a 1 µm grain diameter or more is 1.0 pieces/mm$^2$ or less, the destruction starting from the AlN grains is prevented. In order to more effectively prevent the destruction starting from the AlN grains, the density of the AlN grains having a 1 µM grain diameter or more is preferably 0.5 pieces/mm$^2$ or less, and more preferably 0.1 pieces/mm$^2$ or less.

Incidentally, the average grain diameter of the TiN grains and the density of the AlN grains having a 1 µm grain diameter or more may be measured at any thickness position in the steel sheet except the uppermost surface of the steel sheet where an amount of the grains is small. For example, similarly to later-described retained austenite, ferrite, and so on, they are preferably measured at a ⅛ to ⅜ thickness position as an area representing the steel sheet, for instance.

In the present invention, the AlN grain having a 1 µM grain diameter or more means an AlN grain whose circle-equivalent diameter d is 1 µm or more. The circle-equivalent diameter d is a diameter of a circle having an area equal to a projected area S of the grain obtained by image analysis, and is found by the following expression. $d=\sqrt{(4S/\pi)}$ The density of the AlN grains in the present invention is found by the following method, for instance.

Specifically, a 10.0 mm$^2$ area or larger of the thicknesswise cross section parallel to the rolling direction is observed by using a field emission scanning electron microscope (FE-SEM), the number of 1 µm AlN grains or larger are counted, and the density thereof is calculated. Note that components of the AlN grains can be confirmed by using an energy dispersive X-ray spectroscope attached to the FE-SEM.

The steel sheet structure of the high-strength steel sheet of the present invention contains 1 to 8% retained austenite in volume fraction in a ⅛ thickness to ⅜ thickness region across ¼ of a sheet thickness, and an average aspect ratio of the retained austenite is 2.0 or less, and an amount of solid-solution Mn in the retained austenite is 1.1 times an average amount of Mn or more.

The volume fraction of the retained austenite is desirably 1 to 8% in the whole steel sheet structure. However, a metal structure in the ⅛ thickness to ⅜ thickness region across ¼ of the thickness of the steel sheet represents the structure of the whole steel sheet. Therefore, if the volume fraction of the retained austenite contained in the ⅛ thickness to ⅜ thickness region of the steel sheet is 1 to 8%, it can be considered that the volume fraction of the retained austenite contained in the whole structure of the steel sheet is 1 to 8%. Therefore, in the present invention, a range of the volume fraction of the retained austenite in the ⅛ thickness to ⅜ thickness region of the base steel sheet is stipulated.

Further, it is preferable that, in the ⅛ thickness to ⅜ thickness region, the steel sheet structure of the high-strength steel sheet of the present invention contains, in volume fraction, 10 to 75% ferrite, one of or both of bainitic ferrite and bainite totally in 10 to 50%, and 5 to 50% tempered martensite besides the retained austenite, pearlite is limited to 5% or less in volume fraction, and fresh martensite is limited to 15% or less in volume fraction. The high-strength steel sheet of the present invention, when having such a steel sheet structure, has more excellent formability.

Similarly, these metal structures such as the ferrite are desirably in the predetermined ranges in the whole steel sheet structure. However, the metal structure in the ⅛ thickness to ⅜ thickness region across ¼ of the thickness of the steel sheet represents the structure of the whole steel sheet. Therefore, if, in the ⅛ thickness to ⅜ thickness region of the steel sheet, 10 to 75% ferrite, one of or both of bainitic ferrite and bainite totally in 10 to 50%, and 5 to 50% tempered martensite are contained in volume fraction, pearlite is limited to 5% or less in volume fraction, and fresh martensite is limited to 15% or less in volume fraction, it can be considered that these metal structures such as the ferrite are substantially in the predetermined ranges in the whole structure of the steel sheet. Therefore, in the present invention, in the ⅛ thickness to ⅜ thickness region of the steel sheet, the ranges of the volume fractions of these metal structures such as the ferrite are stipulated.

"Retained Austenite"

The retained austenite needs to be contained within a range not impairing the drawing value at low temperatures in order to greatly improve strength and ductility. When the volume fraction of the retained austenite is less than 1%, the improvement in strength and ductility is insufficient, and this is set as a low limit. In view of strength and formability, an amount of the retained austenite is preferably 1.5% or more, and preferably 2.0% or more. On the other hand, since the retained austenite works as the starting point of destruction to greatly deteriorate bendability; its volume fraction in the steel sheet structure needs to be limited to 8% or less. In order to increase bendability, the volume fraction of the retained austenite is more preferably 6% or less.

Further, in order to prevent the destruction starting from the retained austenite, it is preferable that the retained austenite has a stable shape and is chemically stable.

In the present invention, the retained austenite has a 2.0 average aspect ratio or less and has a stable shape excellent in isotropy. In order to make the shape of the retained austenite more stable, the average aspect ratio of the retained austenite is preferably 1.8 or less, and more preferably 1.6 or less. A lower limit of the average aspect ratio of the retained austenite is 1.0. When the average aspect ratio is over 2.0, part of the retained austenite easily transforms into martensite when stretched at low temperatures, so that the starting point of destruction is generated, leading to deterioration in the drawing value.

In the present invention, the amount of the solid-solution Mn in the retained austenite is 1.1 times the average amount of Mn or more "(the amount of the solid-solution Mn in the retained austenite/the average amount of Mn)≥1.1", whereby the retained austenite is made chemically stable. In order to make the retained austenite more chemically stable, the amount of the solid-solution Mn in the retained austenite is preferably 1.2 times the average amount of Mn or more, and more preferably 1.3 times or more. Its upper limit is not particularly set, but to set it 2.0 times or more requires special facility, and 2.0 times is set as a practical upper limit.

"Ferrite"

The ferrite is a structure effective for improving the drawing value at low temperatures and is preferably contained in the steel sheet structure in 10 to 75% in volume fraction. When the volume fraction of the ferrite is less than 10%, a sufficient drawing value may not be obtained. In view of the drawing value, the volume fraction of the ferrite contained in the steel sheet structure is preferably 15% or more, and more preferably 20% or more. On the other hand, since the ferrite is a soft structure, when its volume fraction is over 75%, sufficient strength is not sometimes obtained. In order to sufficiently increase tensile strength of the steel sheet, the volume fraction of the ferrite contained in the steel sheet structure is preferably 65% or less, and more preferably 50% or less.

"Pearlite"

When an amount of the pearlite is large, ductility deteriorates. From this, the volume fraction of the pearlite contained in the structure of the steel sheet is preferably limited to 5% or less, and more preferably 2% or less.

"Bainitic Ferrite, Bainite"

The bainitic ferrite and the bainite are structures excellent in balance of strength and ductility, and the steel sheet structure preferably contains one of or both of the bainitic ferrite and the bainite totally in a 10 to 50% volume fraction. Further, the bainitic ferrite and the bainite are microstructures having intermediate strength between those of soft ferrite and hard martensite and between those of tempered martensite and retained austenite, and in view of stretch flangeability, their total content is preferably 15% or more, and still more preferably 20% or more. On the other hand, when the total volume fraction of the bainitic ferrite and the bainite is over 50%, a yield stress excessively increases to deteriorate shape fixability, which is not preferable. Incidentally, only one of the bainitic ferrite and the bainite may be contained, or both of them may be contained.

"Fresh Martensite"

The fresh martensite greatly improves tensile strength, but on the other hand, works as the starting point of destruction to greatly deteriorate the drawing value at low temperatures, and therefore its volume fraction in the steel sheet structure is preferably limited to 15% or less. In order to increase the drawing value at low temperatures, the volume fraction of the fresh martensite is more preferably 10% or less, and still more preferably 5% or less.

"Tempered Martensite"

The tempered martensite is a structure that greatly improves tensile strength and may be contained in the steel sheet structure in 50% volume fraction or less. In view of tensile strength, the volume fraction of the tempered martensite is preferably 10% or more. On the other hand, when the volume fraction of the tempered martensite contained in the steel sheet structure is over 50%, a yield stress excessively increases and shape fixability deteriorates, which is not preferable.

"Others"

The steel sheet structure of the high-strength steel sheet may contain structures such as coarse cementite other than the above. However, when an amount of the coarse cementite becomes large in the steel sheet structure, bendability deteriorates. From this, the volume fraction of the coarse cementite contained in the steel sheet structure is preferably 10% or less, and more preferably 5% or less.

The volume fractions of the respective structures contained in the steel sheet structure of the high-strength steel sheet of the present invention can be measured by the following methods, for instance.

As for the volume fraction of the retained austenite, an X-ray diffraction test is conducted on a given surface that is parallel to a sheet surface of the steel sheet and is in the ⅛ thickness to ⅜ thickness region, an area fraction of the retained austenite is calculated, and this area fraction can be regarded as the volume fraction in the ⅛ thickness to ⅜ thickness region.

The microstructure in the ⅛ thickness to ⅜ thickness region has high homogeneity, and by the measurement in a sufficiently wide range, it is possible to obtain a microstructure fraction representing the fraction in the ⅛ thickness to ⅜ thickness region, at whichever place of the ⅛ thickness to ⅜ thickness the measurement is conducted. Concretely, the X-ray diffraction test is preferably conducted in a 250000 square En range or larger in a ¼ thickness surface parallel to the sheet surface of the steel sheet.

Further, the fractions of the microstructures (ferrite, bainitic ferrite, bainite, tempered martensite, pearlite, fresh martensite) except the retained austenite can be measured by the observation in the ⅛ thickness to ⅜ thickness region by an electron microscope. Concretely, a surface perpendicular to the sheet surface of the base steel sheet and parallel to the rolling direction (reduction direction) is set as an observation surface, and a sample is picked up therefrom, and the observation surface is polished and nital-etched. Then, the ⅛ thickness to ⅜ thickness region across ¼ of the sheet thickness is observed by a field emission scanning electron microscope (FE-SEM) to measure the area fraction. In this case, for example, the observation by the electron microscope is conducted in three or more fields of view which are set at intervals of 1 mm or more in the ⅛ thickness to ⅜ thickness region. Then, the area fractions of the respective structures such as the ferrite in a totally 5000 square µM region or larger of the observation area are calculated, and these area fractions can be regarded as the volume fractions of the respective structures in the ⅛ thickness to ⅜ thickness region.

The ferrite is a nugget-shaped crystal grain and is an area in which an iron-based carbide with a 100 nm major axis or more does not exist. Note that the volume fraction of the ferrite is the sum of a volume fraction of ferrite remaining at a maximum heating temperature and a volume fraction of ferrite newly generated at a ferrite transformation temperature region.

The bainitic ferrite is an aggregation of lath-shaped crystal grains and does not contain, inside the lath, an iron-based carbide having a 20 nm major axis or more.

The bainite is an aggregation of lath-shaped crystal grains and has, inside the lath, a plurality of iron-based carbides having a 20 nm major axis or more, and these carbides belong to a single variant, that is, to an iron-based carbide group extending in the same direction. Here, the iron-based carbide group extending in the same direction means that a difference in the extension direction in the iron-carbide group is within 5°.

The tempered martensite is an aggregation of lath-shaped crystal grains and has, inside the lath, a plurality of iron-based carbides having a 20 nm major axis or more, and these carbides belong to a plurality of variants, that is, a plurality of iron-based carbide groups extending in different directions.

By observing the iron-based carbides inside the lath-shaped crystal grains by using FE-SEM and examining the extension directions thereof, it is possible to easily discriminate between the bainite and the tempered martensite.

Further, the fresh martensite and the retained austenite are not corroded sufficiently by the nital etching. Therefore, in the observation by FE-SEM, they can be clearly discriminated from the aforesaid structures (ferrite, bainitic ferrite, bainite, and tempered martensite).

Therefore, the volume fraction of the fresh martensite is found as a difference between an area fraction of an uncorroded area observed by FE-SEM and an area fraction of the retained austenite measured by an X-ray.

(Galvanized Layer)

Further, the present invention can be a high-strength galvanized steel sheet excellent in impact resistance in which a galvanized layer is formed on a surface of the high-strength steel sheet. The galvanized layer may be alloyed. When the galvanized layer is formed on the surface of the high-strength steel sheet, the steel sheet has excellent corrosion resistance. Further, when the alloyed galvanized layer is formed on the surface of the high-strength steel sheet, the steel sheet has excellent corrosion resistance and is excellent in adhesiveness of a coating material. Further, the galvanized layer or the alloyed galvanized layer may contain Al as impurities.

The alloyed galvanized layer may contain one or two or more of Pb, Sb, Si, Sn, Mg, Mn, Ni, Cr, Co, Ca, Cu, Li, Ti, Be, Bi, Sr, I, Cs, and REM, or they may be mixed therein. Even when the alloyed galvanized layer contains one or two or more of the aforesaid elements, or they are mixed therein, the effects of the present invention are not impaired, and depending on the content thereof, this is sometimes preferable since corrosion resistance and workability are improved.

Regarding an coating weight of the galvanized layer or the alloyed galvanized layer, any special restriction is not provided, but the coating weight is desirably 20 g/m$^2$ or more in view of corrosion resistance and 150 g/m$^2$ or less from an economic point of view. Further, an average thickness of the galvanized layer or the alloyed galvanized layer is set to not less than 1.0 µm nor more than 50 µm. When the average thickness is less than 1.0 µm, sufficient corrosion resistance is not obtained. Preferably, the average thickness is 2.0 µm or more. On the other hand, the average thickness of over 50.0 µm is not preferable because this is not economical and impairs strength of the steel sheet. In view of material cost, the thickness of the galvanized layer or the alloyed galvanized layer is preferably as small as possible, and is preferably 30.0 µm or less.

As for the average thickness of the plated layer, a thicknesswise cross section parallel to the rolling direction of the steel sheet is mirror-finished, the cross section is observed by using FE-SEM, and the thickness of the plated layer is measured at five points on each of a front surface and a rear surface of the steel sheet, totally at ten points, and an average value of the measured values is set as the thickness of the plated layer.

Incidentally, when the alloying process is applied, the content of iron of the alloyed galvanized layer is set to 8.0% or more and is preferably 9.0% or more in order to ensure good flaking resistance. Further, in order to ensure good powdering resistance, the content of the iron in the alloyed galvanized layer is set to 12.0% or less, and preferably 11.0% or less.

Further, in the present invention, a coating film made of a phosphorus oxide and/or a composite oxide containing phosphorus may be formed on the surface of the aforesaid galvanized layer or alloyed galvanized layer. The coating film made of the composite oxide containing the phosphorus oxide and/or phosphorus can function as a lubricant when the steel sheet is worked, and can protect the galvanized layer formed on the surface of the steel sheet.

(Manufacturing Method)

Next, a manufacturing method of the high-strength steel sheet of the present invention will be described in detail.

In order to manufacture the high-strength steel sheet of the present invention, a slab having the aforesaid chemical components (composition) is first formed by casting.

As the slab to be hot-rolled, a continuously cast slab or one manufactured by a thin slab caster or the like is usable. The manufacturing method of the high-strength steel sheet of the present invention is compatible with a process such as continuous casting-direct rolling (CC-DR) in which the hot rolling is performed immediately after the casting.

(Hot-Rolling Step)

In a hot-rolling step, a slab heating temperature needs to be 1210° C. or higher in order to sufficiently melt a Ti-based inclusion generated at the time of the casting and uniformly solid-dissolve Ti in the steel, and is preferably 1225° C. or higher. Further, when the slab heating temperature is excessively low, a finish rolling temperature becomes lower than an $Ar_3$ transformation point. As a result, the rolling is performed in a two-phase region of ferrite and austenite, a hot-rolled sheet structure becomes a heterogeneous duplex grain structure, and even after a cold-rolling step and a continuous annealing step, the heterogeneous structure does not disappear, resulting in a steel sheet poor in ductility and bendability. Further, the decrease in the slab heating temperature leads to an excessive increase in a rolling load, which involves a concern that the rolling becomes difficult and a shape of the steel sheet having undergone the rolling becomes poor. The effects of the present invention are exhibited without particularly setting an upper limit of the slab heating temperature, but excessively increasing the heating temperature is not preferable from an economic point of view, and therefore, the upper limit of the slab heating temperature is desirably 1350° C. or lower.

The $Ar_3$ transformation point is calculated by the following expression.

$$Ar_3 = 901 - 325 \times C + 33 \times Si - 92 \times (Mn + Ni/2 + Cr/2 + Cu/2 + Mo/2) + 52 \times Al$$

In the above expression, C, Si, Mn, Ni, Cr, Cu, Mo, and Al are contents [mass %] of the respective elements. Elements not contained are calculated as 0.

In the present invention, after the heating to the aforesaid slab heating temperature, reduction is applied under a condition satisfying the following (Expression 1) in a temperature range of at least 1100 to 1000° C. In (Expression 1), i represents the number of passes, Ti represents a working temperature of the $i^{th}$ pass, ti is an elapsed time from the $i^{th}$ pass to the $i+1^{th}$ pass, and εi represents a reduction ratio of the $i^{th}$ pass.

[Numerical Expression 1]

$$1.0 \leq \left\{ \sum_{i=1}^{n} \left[ \left\{ \frac{-97.2 + 5.47 \cdot (T_{i+1} + T_i)^{1/2} - }{0.067 \cdot (T_{i+1} + T_i)} \right\}^2 \cdot \exp\left(-\frac{20800}{T_{i+1} + T_i}\right) \cdot t_i \cdot \varepsilon_i^{1/2} \right]\right\}^{1/2} \leq 5.0 \quad \text{(Expression 1)}$$

In order to manufacture a steel sheet containing fine TiN grains while suppressing the generation of coarse Ti nitride and Al nitride, a large amount of dislocation being a generation site of the Ti nitride needs to be introduced into the steel by hot rolling in a temperature range of 1100 to 1000° C. However, in the temperature range of 1100 to 1000° C., the dislocation introduced by the working easily extinguish due to the diffusion of Fe atoms. Therefore, the working (reduction) by which a strain amount large enough to sufficiently introduce the dislocation is obtained needs to be continuously performed in a relatively short time. That is, the number of passes needs to be plural, the elapsed time between the adjacent passes needs to be short, and a working temperature and a reduction ratio in each of the passes need to be appropriately controlled.

In the hot-rolling step, after the slab is taken out from a heating furnace, it is possible to perform the reduction of an arbitrary number of the passes in a temperature region up to a rolling completion temperature whose lower limit is the higher one of 850° C. and the Ar3 temperature. In the hot-rolling, the reduction performed in the range of 1100 to 1000° C. has a great influence on a dispersion state of the problematic TiN and AlN grains, and therefore, the hot rolling condition in the same temperature range is stipulated by using (Expression 1).

Reduction performed in a temperature range of over 1100° C. does not influence the dispersion state of the problematic TiN and AlN grains since the dislocation introduced at the time of the transformation instantaneously extinguishes and does not work as a segregation site of TiN. On the other hand, by the time rolling is applied in a range of lower than 1000° C., the generation of nuclei of grains that can be coarse TiN and AlN is completed, and the rolling thereafter (the temperature range of lower than 1000° C.) does not influence the dispersion state of the problematic TiN and AlN grains.

Generally, during a period from an instant when the slab is taken out from the heating furnace to an instant when the rolling is completed, the rolling of 8 to 25 passes is performed. The reduction in the range of 1100° C. to 1000° C. is performed for 2 to 10 passes. Generally, the reduction in this temperature range starts from a 200 to 500 mm sheet thickness, and the rolling is performed up to a 10 to 50 mm sheet thickness. A sheet width is generally 500 to 2000 mm. Note that the temperature of the steel sheet is a temperature on the surface, and though its measuring method may be any, the temperature may be directly measured by using a thermocouple, for instance.

In (Expression 1), concretely, the number i of the passes can be in a range of 2 to 10, preferably in a range of 5 to 8, for instance. The elapsed time from the pass to $i+1^{th}$ pass can be in a range of 2 to 300 seconds, preferably in a range of 5 to 180 seconds, and more preferably in a range of 10 to 120 seconds.

Further, the working temperature of the 1st pass being the initial pass in the hot-rolling in the temperature range of 1100 to 1000° C. can be in a range of 1100 to 1050° C., and preferably in a range of 1090 to 1065° C. The reduction ratio of the $i^{th}$ pass can be in a range of 5 to 50%, and preferably in a range of 15 to 35%.

In (Expression 1), which is an empirical formula expressing a generation behavior of the TiN grains, a diffusion distance of atoms is expressed by a product of a term of a polynomial expressing a driving force of the grain generation, an exp term expressing a diffusion coefficient of the atoms, and time t, and an amount of the dislocation introduced in accordance with the working is representatively expressed by the strain amount ε, and they are multiplied. When a value expressed by (Expression 1) is blow 1.0, the generation of TiN is insufficient, solid-solution N remains until an instant of the hot-rolling to 1000° C., and coarse AlN is generated. On the other hand, when the value expressed by (Expression 1) is over 5.0, the generation of TiN becomes excessively active, TiN is promoted to be coarse, and the property is impaired, instead.

In the present invention, by performing the reduction in the temperature range of at least 1100 to 1000° C. under the condition satisfying the above (Expression 1), the elapsed time between the adjacent plural passes is controlled to be relatively short and the working temperature and the reduction ratio in each of the passes are appropriately controlled, and therefore, a large amount of the dislocation being the generation site of the Ti nitride can be introduced into the steel, and the fine Ti nitride can be generated in the steel. Note that the reduction performed in the temperature range of over 1100° C. and the reduction performed in the temperature range of lower than 1000° C. are not particularly limited. For example, the reduction may be performed in the temperature range of over 1100° C. under the condition satisfying the above (Expression 1) or may be performed under a condition not satisfying the above (Expression 1). Alternatively, the reduction in the temperature range of over 1100° C. need not be performed. Similarly, the reduction in the temperature range of lower than 1000° C. may be performed under the condition satisfying the above (Expression 1) or may be performed under a condition not satisfying the above (Expression 1).

In the present invention, after the hot rolling is performed in the temperature range of at least 1100 to 1000° C. under the condition satisfying the above (Expression 1), the hot rolling is completed at the finish hot-rolling temperature that is not lower than the higher temperature of 800° C. and the $Ar_3$ transformation point nor higher than 970° C., and coiling is performed in a temperature region of 750° C. or lower. Note that a sheet thickness after the finish rolling is, for example, 2 mm to 10 mm. When the finish rolling temperature is lower than 800° C., the rolling load at the time of the finish rolling becomes high, which is liable to make the hot rolling difficult and to cause a poor shape of the hot-rolled steel sheet obtained after the hot rolling. Further, when the finish rolling temperature is lower than the $Ar_3$ transformation point, the hot rolling becomes the rolling in the two phase region of ferrite and austenite, which sometimes makes the structure of the hot-rolled steel sheet a heterogeneous duplex grain structure. On the other hand, when an upper limit of the finish rolling temperature is 970° C. or higher, the generation of TiN becomes insufficient, and there is a possibility that extra N generates a nitride with Al.

In the present invention, in the hot-rolling step, the hot rolling is performed in the temperature range of 1100 to 1000° C. under the condition satisfying the above (Expression 1), and the hot rolling is completed at the finish hot rolling temperature that is not lower than the higher temperature of 800° C. and the $Ar_3$ transformation point nor higher than 970° C., which makes it possible to suppress the generation of the coarse Ti nitride in the temperature range of 1100 to 1000° C. and to generate the fine TiN grains during a period until the temperature reaches the finish hot-rolling temperature from 1000° C. As a result, the finally obtained high-strength steel sheet has excellent impact resistance.

In order to prevent deterioration in picklability due to an excessive increase in a thickness of an oxide formed on a surface of the hot-rolled steel sheet, the coiling temperature is set to 750° C. or lower. In order to further enhance picklability, the coiling temperature is preferably 720° C. or lower, and more preferably 700° C. or lower.

On the other hand, when the coiling temperature is lower than 500° C., strength of the hot-rolled steel sheet excessively increases and cold rolling becomes difficult, and therefore, the coiling temperature is preferably 500° C. or higher. In order to reduce a load of the cold rolling, the coiling temperature is preferably 550° C. or higher, and more preferably 600° C. or higher.

Next, the hot-rolled steel sheet coiled in the above temperature region is cooled at an average cooling rate of 15° C./hour or less. Consequently, the distribution of Mn solid-dissolved in the steel sheet is promoted, which makes it possible to selectively leave the retained austenite in an area where Mn is concentrated and increase an amount of the solid-solution Mn in the retained austenite. As a result, the finally obtained high-strength steel sheet becomes one in which an amount of the solid-solution Mn in the retained austenite is 1.1 times an average amount of Mn or more. The distribution of Mn after the coiling progresses more as the temperature is higher. Therefore, it is necessary to set the cooling rate of the steel sheet to 15° C./hour or less, especially in a range from the coiling temperature (coiling temperature−50° C.).

Next, the hot-rolled steel sheet thus manufactured is preferably pickled. The pickling is important for improving platability of the steel sheet because it removes the oxide on the surface of the hot-rolled steel sheet. Further, the pickling may be performed once or may be performed in a plurality of separate stages.

(Cold-Rolling Step)

Next, in order for the retained austenite to have a stable shape excellent in isotropy, the hot-rolled steel sheet having undergone the pickling is subjected to a cold-rolling step where it is cold-rolled at a reduction ratio of 30 to 75%. When the reduction ratio is less than 30%, the retained austenite cannot have a stable shape, and in the finally obtained high-strength steel sheet, the average aspect ratio of the retained austenite does not become 2.0 or less. In order for the retained austenite to have a stable shape, the reduction ratio in the cold-rolling step is preferably 40% or more, and more preferably 45% or more. On the other hand, when the reduction ratio in the cold rolling is over 75%, the cold-rolling load becomes excessively large and the cold rolling becomes difficult. Therefore, the reduction ratio is preferably 75% or less. In view of the cold-rolling load, the reduction ratio is more preferably 70% or less.

Note that the effects of the present invention are exhibited without particularly stipulating the number of the rolling passes and the reduction ratio of each of the rolling passes in the cold-rolling step.

(Continuous Annealing Step)

Next, the cold-rolled steel sheet obtained after the cold-rolling step is subjected to a continuous annealing step where it passes through a continuous annealing line. In the continuous annealing step in the present invention, annealing is performed where heating is performed in a temperature range of 550 to 700° C. at an average heating rate of 10° C./second or less, a maximum heating temperature is set to (an $Ac_1$ transformation point+40) to 1000° C., and cooling is performed in a temperature range of the maximum heating temperature to 700° C. at an average cooling rate of 1.0 to 10.0° C./second, cooling is performed in a temperature range of 700 to 500° C. at an average cooling rate of 5.0 to 200.0° C./second, and a retention process is performed for 30 to 1000 seconds in a temperature range of 350 to 450° C. Consequently, the high-strength steel sheet of the present invention is obtained.

In the continuous annealing step, as a result of the heating in the temperature range of 550 to 700° C. at the average heating rate of 10° C./second or less, recrystallization of the cold-rolled steel sheet sufficiently progresses, the retained austenite has a stable shape more excellent in isotropy, and the finally remaining austenite has a shape close to a sphere shape. When the average heating rate in the temperature range of 550 to 700° C. is over 10° C./second, the retained austenite cannot have a stable shape.

Further, when the maximum heating temperature in the continuous annealing step is lower than (the $Ac_1$ transformation point+40)° C., many coarse iron-based carbides are left unmelted in the steel sheet and formability greatly deteriorates, and therefore the maximum heating temperature is set to (the $Ac_1$ transformation point+40)° C. or higher. In view of formability, the maximum heating temperature is preferably (the $Ac_1$ transformation point+50)° C. or higher, and more preferably (the $Ac_1$ transformation point+60)° C. or higher. On the other hand, when the maximum heating temperature is higher than 1000° C., the diffusion of atoms is promoted and the distribution of Si, Mn, and Al weakens, and therefore, the maximum heating temperature is set to 1000° C. or lower. In order to control amounts of Si, Mn, and Al in the retained austenite, the maximum heating temperature is preferably the $Ac_3$ transformation point temperature or lower.

In the temperature range of the maximum heating temperature to 700° C., when the average cooling rate is over 10.0° C./second, a ferrite fraction in the steel sheet is likely to be uneven, resulting in deterioration in formability, and therefore, an upper limit of the average cooling rate is set to 10.0° C./second. On the other hand, when the average cooling rate is less than 1.0° C./second, ferrite and pearlite are generated in large amount and the retained austenite is not obtained, and therefore, a lower limit of the average cooling rate is set to 1.0° C./second. In order to obtain the retained austenite, the average cooling rate is preferably 2.0° C./second or more, and more preferably 3.0° C./second or more.

In the temperature range of 700 to 500° C., when the average cooling rate is less than 5.0° C./second or less, pearlite and/or an iron-based carbide are generated in large amount and the retained austenite does not remain, and therefore, a lower limit of the average cooling rate is set to 5.0° C./second or more. From this point of view, the average cooling rate is preferably 7.0° C./second or more, and more preferably 8.0° C./second or more. On the other hand, the effects of the present invention are exhibited without particularly setting an upper limit of the average cooling rate, but in order for the average cooling rate to be over 200° C./second, a special facility is required, and the upper limit of the average cooling rate is set to 200° C./second in view of cost.

Further, in order to promote bainite transformation to obtain the retained austenite, the retention process for the retention in the temperature range of 350 to 450° C. for 30 to 1000 seconds is performed. When the retention time is short, the bainite transformation does not progress and the concentration of C into the retained austenite becomes insufficient, so that the retained austenite cannot be sufficiently left. From this point of view, a lower limit of the retention time is set to 30 seconds. The retention time is preferably 40 seconds or longer, and more preferably 60 seconds or longer. On the other hand, when the retention time is excessively long, the iron-based carbide is generated, C is consumed by this iron-based carbide, and the retained austenite cannot be sufficiently obtained, and therefore, the retention time is set to 1000 seconds or shorter. From this point of view, the retention time is preferably 800 seconds or shorter, and more preferably 600 seconds or shorter.

Further, in the present invention, in the continuous annealing step of the above-described manufacturing method, electrogalvanization may be applied after the aforesaid retention process to form a galvanized layer on the surface of the steel sheet, thereby producing a high-strength galvanized steel sheet.

Further, in the present invention, in the continuous annealing step of the above-described manufacturing method, after the cooling in the temperature range of 700 to 500° C., the steel sheet may be immersed in a galvanizing bath before the retention process in the temperature range of 350 to 450° C. or after the retention process, to form a galvanized layer on the surface of the steel sheet, thereby producing a high-strength galvanized steel sheet.

Consequently, a high-strength galvanized steel sheet excellent in impact resistance on whose surface the galvanized layer is formed is obtained.

The galvanizing bath is not particularly limited, and even when the galvanizing bath contains one or two or more of Pb, Sb, Si, Sn, Mg, Mn, Ni, Cr, Co, Ca, Cu, Li, Ti, Be, Bi, Sr, I, Cs, and REM, the effects of the present invention are not impaired, and depending on an amount thereof, this has an advantage such as an improvement in corrosion resistance and workability. Further, Al may be contained in the galvanizing bath. In this case, an Al concentration in the bath is preferably not lower than 0.05% nor higher than 0.15%.

Further, a temperature after the alloying process is preferably 480 to 560° C., and the retention time in the alloying process is preferably 15 to 60 seconds.

Further, after the steel sheet is immersed in the galvanizing bath, the alloying process may be applied in which the steel sheet is re-heated to 460° C. to 600° C. and is kept for 2 seconds or more, whereby the galvanized layer is alloyed.

As a result of performing such an alloying process, a Zn—Fe alloy which is an alloyed galvanized layer is formed on the surface, so that a high-strength galvanized steel sheet having the alloyed galvanized layer on the surface is obtained.

Further, on the surface of the galvanized layer or the alloyed galvanized layer of the high-strength galvanized steel sheet, a coating film made of a phosphorus oxide and/or a composite oxide containing phosphorus may be applied.

In this embodiment, the alloying process is preferably followed by the retention at a temperature of 200 to 350° C. for 30 to 1000 seconds. Consequently, the steel sheet structure contains tempered martensite.

Further, instead of the retention at the temperature of 200 to 350° C. for 30 to 1000 seconds after the alloying process, the tempered martensite may be generated by cooling the steel sheet having undergone the alloying process to 350° C. or lower to generate martensite, thereafter re-heating the steel sheet to a temperature range of not lower than 350° C. nor higher than 550° C., followed by 2 second retention or longer. Alternatively, the tempered martensite is generated in the base steel sheet structure also by further cooling the steel sheet, which has been cooled to a temperature region of 500° C. or lower in the continuous annealing step, to 350° C. or lower to generate martensite, and thereafter reheating the steel sheet, followed by the retention at 400 to 500° C.

Note that the present invention is not limited to the above-described example.

For example, in order to improve plating adhesiveness, the steel sheet before being annealed may be plated with one kind or a plurality of kinds selected from Ni, Cu, Co, and Fe.

Further, in this embodiment, the steel sheet having undergone the annealing may be subjected to temper rolling for the purpose of shape correction. However, when a reduction ratio after the annealing is over 10%, a soft ferrite portion is work-hardened, resulting in great deterioration in the ductility, and therefore, the reduction ratio is preferably less than 10%.

EXAMPLES

The present invention will be described in more detail by using examples.

Slabs having chemical components (compositions) A to AF shown in Table 1 and Table 2 and chemical components (compositions) BA to BC shown in Table 3 were formed by casting, and immediately after the casting, they were hot-rolled under conditions (slab heating temperature, rolling start temperature, value of (Expression 1) in hot-rolling in a temperature range of 1100 to 1000° C., finish hot-rolling temperature) shown in Table 4 to Table 7, were cooled, were coiled at coiling temperatures shown in Table 4 to Table 7, were cooled at average cooling rates shown in Table 4 to Table 7, and were subjected to pickling. Thereafter, they were cold-rolled at reduction ratios shown in Table 4 to Table 7.

TABLE 1

| CHEMICAL COMPONENT | C MASS % | Si MASS % | Mn MASS % | P MASS % | S MASS % | Al MASS % | N MASS % | O MASS % | Ti MASS % |
|---|---|---|---|---|---|---|---|---|---|
| A | 0.201 | 1.11 | 1.67 | 0.019 | 0.0025 | 0.014 | 0.0021 | 0.0020 | 0.008 |
| B | 0.162 | 1.18 | 2.37 | 0.022 | 0.0019 | 0.030 | 0.0024 | 0.0007 | 0.005 |
| C | 0.134 | 1.66 | 2.27 | 0.010 | 0.0032 | 0.028 | 0.0015 | 0.0016 | 0.007 |
| D | 0.230 | 0.59 | 2.10 | 0.022 | 0.0031 | 0.036 | 0.0036 | 0.0014 | 0.010 |
| E | 0.108 | 0.59 | 1.50 | 0.014 | 0.0030 | 0.026 | 0.0012 | 0.0011 | 0.004 |
| F | 0.213 | 1.50 | 2.34 | 0.022 | 0.0016 | 0.044 | 0.0016 | 0.0005 | 0.002 |
| G | 0.091 | 1.76 | 2.02 | 0.017 | 0.0021 | 0.017 | 0.0012 | 0.0008 | 0.009 |
| H | 0.162 | 1.06 | 2.87 | 0.010 | 0.0035 | 0.030 | 0.0025 | 0.0020 | 0.007 |
| I | 0.182 | 0.39 | 2.59 | 0.023 | 0.0016 | 0.037 | 0.0041 | 0.0017 | 0.004 |
| J | 0.147 | 1.30 | 2.07 | 0.015 | 0.0035 | 0.016 | 0.0027 | 0.0006 | 0.001 |
| K | 0.202 | 0.86 | 1.85 | 0.010 | 0.0016 | 0.029 | 0.0037 | 0.0010 | 0.008 |
| L | 0.118 | 1.15 | 1.81 | 0.022 | 0.0023 | 0.036 | 0.0028 | 0.0004 | 0.013 |
| M | 0.111 | 0.77 | 2.57 | 0.016 | 0.0028 | 0.018 | 0.0018 | 0.0011 | 0.004 |
| N | 0.169 | 1.99 | 1.97 | 0.012 | 0.0031 | 0.032 | 0.0033 | 0.0008 | 0.011 |
| O | 0.135 | 0.50 | 2.27 | 0.013 | 0.0025 | 0.015 | 0.0026 | 0.0024 | 0.008 |
| P | 0.209 | 1.39 | 1.40 | 0.019 | 0.0026 | 0.022 | 0.0011 | 0.0012 | 0.012 |
| Q | 0.121 | 2.07 | 2.38 | 0.007 | 0.0033 | 0.011 | 0.0013 | 0.0007 | 0.007 |
| R | 0.263 | 0.85 | 2.40 | 0.016 | 0.0027 | 0.031 | 0.0012 | 0.0028 | 0.003 |
| S | 0.117 | 1.41 | 1.77 | 0.013 | 0.0034 | 0.030 | 0.0029 | 0.0016 | 0.011 |
| T | 0.149 | 1.27 | 1.65 | 0.018 | 0.0018 | 0.009 | 0.0021 | 0.0013 | 0.006 |
| U | 0.100 | 1.56 | 2.67 | 0.016 | 0.0025 | 0.019 | 0.0026 | 0.0023 | 0.005 |
| V | 0.177 | 1.21 | 2.50 | 0.009 | 0.0041 | 0.029 | 0.0009 | 0.0018 | 0.002 |
| W | 0.118 | 0.98 | 1.69 | 0.022 | 0.0019 | 0.018 | 0.0034 | 0.0013 | 0.005 |
| X | 0.082 | 0.74 | 2.04 | 0.010 | 0.0022 | 0.033 | 0.0014 | 0.0017 | 0.011 |
| Y | 0.177 | 0.64 | 2.31 | 0.021 | 0.0022 | 0.029 | 0.0008 | 0.0011 | 0.004 |
| Z | 0.103 | 0.54 | 3.13 | 0.024 | 0.0032 | 0.022 | 0.0024 | 0.0005 | 0.005 |
| AA | 0.104 | 0.95 | 2.03 | 0.015 | 0.0028 | 0.041 | 0.0034 | 0.0022 | 0.000 |
| AB | 0.095 | 1.02 | 2.02 | 0.013 | 0.0025 | 0.035 | 0.0033 | 0.0022 | <u>0.094</u> |
| AC | 0.101 | 1.05 | 2.05 | 0.019 | 0.0030 | 0.037 | 0.0033 | <u>0.0096</u> | 0.004 |
| AD | 0.098 | 1.01 | 2.04 | 0.016 | <u>0.0095</u> | 0.034 | 0.0027 | 0.0016 | 0.005 |
| AE | 0.102 | 1.05 | 2.03 | 0.016 | 0.0033 | <u>0.499</u> | 0.0031 | 0.0024 | 0.004 |
| AF | 0.096 | 0.99 | 1.97 | 0.020 | 0.0034 | 0.034 | <u>0.0096</u> | 0.0017 | 0.004 |

TABLE 2

| | Nb MASS % | B MASS % | Cr MASS % | Ni MASS % | Cu MASS % | Mo MASS % | V MASS % | Ca MASS % | Ce MASS % | Mg MASS % | Zr MASS % | Hf MASS % | REM MASS % | |
|---|---|---|---|---|---|---|---|---|---|---|---|---|---|---|
| A | | | | | | | | | | | | | | EXAMPLE |
| B | | | | | | | | | | | | | | EXAMPLE |
| C | | | | | | | | | | | | | | EXAMPLE |
| D | | | | | | | | | | | | | | EXAMPLE |
| E | 0.013 | | | | | | | | | | | | | EXAMPLE |

TABLE 2-continued

| | Nb MASS % | B MASS % | Cr MASS % | Ni MASS % | Cu MASS % | Mo MASS % | V MASS % | Ca MASS % | Ce MASS % | Mg MASS % | Zr MASS % | Hf MASS % | REM MASS % | |
|---|---|---|---|---|---|---|---|---|---|---|---|---|---|---|
| F | | 0.0016 | | | | | | | | | | | | EXAMPLE |
| G | | | | 0.20 | | | | | | | | | | EXAMPLE |
| H | | | | | 0.35 | | | | | | | | | EXAMPLE |
| I | 0.007 | | | | | | | 0.0020 | | | | | | EXAMPLE |
| J | | | | | | 0.20 | | | | | | | | EXAMPLE |
| K | | | | | | 0.13 | | | | 0.0005 | | | | EXAMPLE |
| L | | | 0.55 | | | | | | | | | | | EXAMPLE |
| M | | | | | | | | | 0.0015 | | | | | EXAMPLE |
| N | | | 0.28 | | | | | | | | | | | EXAMPLE |
| O | | | | | | | | 0.035 | | | | | | EXAMPLE |
| P | 0.014 | 0.0031 | | | | | | | | | | | | EXAMPLE |
| Q | | | | | | | | | | 0.0030 | | | | EXAMPLE |
| R | | | | | | | | | | | 0.0015 | | | EXAMPLE |
| S | | | | 0.64 | 0.56 | | | | | | | | | EXAMPLE |
| T | | 0.0009 | | | | | 0.069 | | | | | | | EXAMPLE |
| U | | | | | | | | | | | | 0.0018 | | EXAMPLE |
| V | | | | | | | | | | | | | 0.0029 | EXAMPLE |
| W | 0.004 | | | | | | | 0.0015 | 0.0013 | | | | | EXAMPLE |
| X | | | | 0.32 | 0.10 | | | | | | | | 0.0028 | EXAMPLE |
| Y | | | 0.12 | | | | 0.09 | | | | | | | EXAMPLE |
| Z | | | | | | | | | 0.0026 | | | | | EXAMPLE |
| AA | | | | | | | | | | | | | | COMPARATIVE EXAMPLE |
| AB | | | | | | | | | | | | | | COMPARATIVE EXAMPLE |
| AC | | | | | | | | | | | | | | COMPARATIVE EXAMPLE |
| AD | | | | | | | | | | | | | | COMPARATIVE EXAMPLE |
| AE | | | | | | | | | | | | | | COMPARATIVE EXAMPLE |
| AF | | | | | | | | | | | | | | COMPARATIVE EXAMPLE |

TABLE 3

| CHEMICAL COMPONENT | C MASS % | Si MASS % | Mn MASS % | P MASS % | S MASS % | Al MASS % | N MASS % | O MASS % | Ti MASS % | Nb MASS % | B MASS % | Cr MASS % | Ni MASS % | Cu MASS % |
|---|---|---|---|---|---|---|---|---|---|---|---|---|---|---|
| BA | 0.096 | 1.16 | 2.91 | 0.012 | 0.0021 | 0.043 | 0.0069 | 0.0010 | 0.014 | | | | | |
| BB | 0.238 | 0.43 | 1.41 | 0.007 | 0.0006 | 0.038 | 0.0051 | 0.0005 | 0.008 | | | | | |
| BC | 0.164 | 0.64 | 1.86 | 0.012 | 0.0014 | 0.046 | 0.0076 | 0.0012 | 0.010 | | | | | |

| CHEMICAL COMPONENT | Mo MASS % | V MASS % | Ca MASS % | Ce MASS % | Mg MASS % | Zr MASS % | Hf MASS % | REM MASS % | W MASS % | |
|---|---|---|---|---|---|---|---|---|---|---|
| BA | | | | | | | | | | EXAMPLE |
| BB | | | | | | | | | | EXAMPLE |
| BC | | | | | | | | | 0.18 | EXAMPLE |

TABLE 4

| EXPERIMENTAL EXAMPLE | CHEMICAL COMPONENT | HOT ROLLING SLAB HEATING TEMPERATURE °C. | Ar₃ TRANSFORMATION POINT °C. | START HOT-ROLLING TEMPERATURE °C. | FINISH HOT-ROLLING TEMPERATURE °C. | EXPRESSION 1 | COILING TEMPERATURE °C. | AVERAGE COOLING RATE °C./HOUR | COLD-ROLLING REDUCTION RATIO % | |
|---|---|---|---|---|---|---|---|---|---|---|
| 1 | A | 1235 | 719 | 1154 | 893 | 3.5 | 652 | 12 | 40 | EXAMPLE |
| 2 | A | 1220 | 719 | 1091 | 932 | 2.0 | 667 | 11 | 40 | EXAMPLE |
| 3 | A | 1250 | 719 | 1166 | 908 | 2.4 | 654 | 11 | 67 | EXAMPLE |
| 4 | A | 1225 | 719 | 1084 | 897 | 2.0 | 643 | 14 | 67 | EXAMPLE |

TABLE 4-continued

| EXPERI-MENTAL EXAMPLE | CHEMICAL COMPONENT | SLAB HEATING TEMPERATURE °C. | HOT ROLLING ||||| COLD-ROLLING REDUCTION RATIO % | |
|---|---|---|---|---|---|---|---|---|---|---|
| | | | $Ar_3$ TRANSFORMATION POINT °C. | START TEMPERATURE °C. | FINISH HOT-ROLLING TEMPERATURE °C. | EXPRESSION 1 | COILING TEMPERATURE °C. | AVERAGE COOLING RATE °C./HOUR | | |
| 5 | A | <u>1100</u> | 719 | 1140 | 900 | 2.3 | 680 | 13 | 67 | COMPARATIVE EXAMPLE |
| 6 | B | 1225 | 671 | 1084 | 945 | 3.7 | 651 | 14 | 54 | EXAMPLE |
| 7 | B | 1230 | 671 | 1143 | 944 | 1.8 | 653 | 11 | 54 | EXAMPLE |
| 8 | B | 1225 | 671 | 1129 | 918 | 1.9 | 679 | 13 | 54 | EXAMPLE |
| 9 | B | 1245 | 671 | 1153 | 932 | 2.6 | 612 | 14 | 54 | EXAMPLE |
| 10 | B | 1230 | 671 | 1092 | 910 | <u>6.1</u> | 598 | 13 | 54 | COMPARATIVE EXAMPLE |
| 11 | C | 1285 | 705 | 1087 | 900 | 2.0 | 606 | 11 | 54 | EXAMPLE |
| 12 | C | 1255 | 705 | 1065 | 955 | 2.6 | 599 | 11 | 54 | EXAMPLE |
| 13 | C | 1230 | 705 | 1148 | 924 | 1.8 | 609 | 11 | 54 | EXAMPLE |
| 14 | C | 1260 | 705 | 1161 | 927 | 2.5 | 628 | 11 | 54 | EXAMPLE |
| 15 | C | 1265 | 705 | 1144 | <u>701</u> | 2.5 | 612 | 12 | 54 | COMPARATIVE EXAMPLE |
| 16 | D | 1255 | 654 | 1142 | 927 | 2.7 | 659 | 11 | 71 | EXAMPLE |
| 17 | D | 1275 | 654 | 1118 | 885 | 1.8 | 653 | 13 | 60 | EXAMPLE |
| 18 | D | 1265 | 654 | 1077 | 966 | 3.3 | 647 | 11 | 60 | EXAMPLE |
| 19 | D | 1250 | 654 | 1113 | 953 | 2.8 | 602 | 14 | 50 | EXAMPLE |
| 20 | D | 1255 | 654 | 1101 | 939 | 2.5 | <u>800</u> | 11 | 60 | COMPARATIVE EXAMPLE |
| 21 | E | 1285 | 749 | 1081 | 886 | 2.1 | 584 | 11 | 50 | EXAMPLE |
| 22 | E | 1250 | 749 | 1180 | 970 | 3.1 | 641 | 13 | 50 | EXAMPLE |
| 23 | E | 1230 | 749 | 1119 | 969 | 1.7 | 635 | 11 | 47 | EXAMPLE |
| 24 | E | 1245 | 749 | 1086 | 909 | 1.9 | 652 | 11 | 47 | EXAMPLE |
| 25 | E | 1245 | 749 | 1097 | 900 | 2.1 | 580 | <u>35</u> | 50 | COMPARATIVE EXAMPLE |
| 26 | F | 1255 | 668 | 1164 | 885 | 3.5 | 615 | 12 | 71 | EXAMPLE |
| 27 | F | 1235 | 668 | 1145 | 942 | 1.6 | 714 | 13 | 60 | EXAMPLE |
| 28 | F | 1240 | 668 | 1151 | 889 | 2.4 | 620 | 14 | 60 | EXAMPLE |
| 29 | F | 1260 | 668 | 1064 | 899 | 2.8 | 636 | 11 | 33 | EXAMPLE |
| 30 | F | 1260 | 668 | 1072 | 955 | 2.6 | 623 | 11 | <u>10</u> | COMPARATIVE EXAMPLE |

TABLE 5

| EXPERI-MENTAL EXAMPLE | CHEMICAL COMPONENT | SLAB HEATING TEMPERATURE °C. | HOT ROLLING ||||| COLD-ROLLING REDUCTION RATIO % | |
|---|---|---|---|---|---|---|---|---|---|---|
| | | | $Ar_3$ TRANSFORMATION POINT °C. | START TEMPERATURE °C. | FINISH HOT-ROLLING TEMPERATURE °C. | EXPRESSION 1 | COILING TEMPERATURE °C. | AVERAGE COOLING RATE °C./HOUR | | |
| 31 | G | 1275 | 735 | 1111 | 943 | 3.4 | 642 | 13 | 40 | EXAMPLE |
| 32 | G | 1260 | 735 | 1162 | 910 | 2.2 | 655 | 12 | 40 | EXAMPLE |
| 33 | G | 1250 | 735 | 1118 | 951 | 2.3 | 676 | 12 | 74 | EXAMPLE |
| 34 | G | 1275 | 735 | 1088 | 957 | 3.4 | 706 | 14 | 54 | EXAMPLE |
| 35 | G | 1225 | 735 | 1154 | 892 | 2.8 | 587 | 11 | 54 | COMPARATIVE EXAMPLE |
| 36 | H | 1245 | 605 | 1123 | 895 | 2.5 | 597 | 14 | 54 | EXAMPLE |
| 37 | H | 1265 | 605 | 1126 | 964 | 2.6 | 584 | 14 | 54 | EXAMPLE |
| 38 | H | 1260 | 605 | 1109 | 894 | 3.3 | 611 | 12 | 36 | EXAMPLE |
| 39 | H | 1230 | 605 | 1161 | 951 | 3.6 | 625 | 12 | 54 | COMPARATIVE EXAMPLE |
| 40 | H | 1250 | 605 | 1156 | 960 | 1.7 | 671 | 12 | 60 | EXAMPLE |
| 41 | I | 1235 | 618 | 1093 | 908 | 1.8 | 621 | 11 | 60 | EXAMPLE |
| 42 | I | 1225 | 618 | 1138 | 887 | 2.6 | 637 | 11 | 60 | EXAMPLE |
| 43 | I | 1230 | 618 | 1169 | 902 | 1.9 | 621 | 13 | 60 | EXAMPLE |
| 44 | I | 1220 | 618 | 1098 | 921 | 2.9 | 645 | 13 | 60 | EXAMPLE |
| 45 | I | 1240 | 618 | 1158 | 917 | 2.1 | 654 | 14 | 60 | COMPARATIVE EXAMPLE |
| 46 | J | 1245 | 697 | 1113 | 915 | 1.8 | 660 | 13 | 67 | EXAMPLE |
| 47 | J | 1220 | 697 | 1158 | 961 | 1.8 | 539 | 13 | 67 | EXAMPLE |
| 48 | J | 1250 | 697 | 1091 | 953 | 3.0 | 656 | 13 | 67 | EXAMPLE |
| 49 | J | 1265 | 697 | 1123 | 913 | 3.0 | 676 | 11 | 36 | EXAMPLE |

TABLE 5-continued

| | | | HOT ROLLING | | | | | | | |
|---|---|---|---|---|---|---|---|---|---|---|
| EXPERIMENTAL EXAMPLE | CHEMICAL COMPONENT | SLAB HEATING TEMPERATURE ° C. | $Ar_3$ TRANSFORMATION POINT ° C. | START TEMPERATURE ° C. | FINISH HOT-ROLLING TEMPERATURE ° C. | EXPRESSION 1 | COILING TEMPERATURE ° C. | AVERAGE COOLING RATE ° C./HOUR | COLD-ROLLING REDUCTION RATIO % | |
| 50 | J | 1250 | 697 | 1089 | 932 | 2.9 | 590 | 11 | 67 | COMPARATIVE EXAMPLE |
| 51 | K | 1255 | 689 | 1111 | 941 | 3.4 | 682 | 14 | 50 | EXAMPLE |
| 52 | K | 1275 | 689 | 1064 | 931 | 3.7 | 587 | 13 | 50 | EXAMPLE |
| 53 | K | 1240 | 689 | 1060 | 932 | 2.1 | 588 | 11 | 67 | EXAMPLE |
| 54 | K | 1230 | 689 | 1126 | 962 | 3.0 | 642 | 11 | 67 | COMPARATIVE EXAMPLE |
| 55 | K | 1260 | 689 | 1158 | 945 | 2.6 | 665 | 11 | 67 | COMPARATIVE EXAMPLE |
| 56 | L | 1285 | 711 | 1102 | 916 | 1.6 | 679 | 12 | 47 | EXAMPLE |
| 57 | L | 1240 | 711 | 1165 | 918 | 2.8 | 675 | 11 | 47 | EXAMPLE |
| 58 | L | 1235 | 711 | 1166 | 884 | 2.9 | 590 | 15 | 47 | EXAMPLE |
| 59 | L | 1225 | 711 | 1067 | 909 | 0.9 | 621 | 11 | 38 | COMPARATIVE EXAMPLE |
| 60 | L | 1255 | 711 | 1066 | 891 | 3.5 | 665 | 12 | 47 | COMPARATIVE EXAMPLE |

TABLE 6

| | | | HOT ROLLING | | | | | | | |
|---|---|---|---|---|---|---|---|---|---|---|
| EXPERIMENTAL EXAMPLE | CHEMICAL COMPONENT | SLAB HEATING TEMPERATURE ° C. | $Ar_3$ TRANSFORMATION POINT ° C. | START TEMPERATURE ° C. | FINISH HOT-ROLLING TEMPERATURE ° C. | EXPRESSION 1 | COILING TEMPERATURE ° C. | AVERAGE COOLING RATE ° C./HOUR | COLD-ROLLING REDUCTION RATIO % | |
| 61 | M | 1240 | 655 | 1165 | 962 | 3.7 | 606 | 13 | 50 | EXAMPLE |
| 62 | M | 1220 | 655 | 1122 | 935 | 3.3 | 605 | 12 | 50 | EXAMPLE |
| 63 | M | 1220 | 655 | 1081 | 966 | 2.5 | 652 | 14 | 50 | EXAMPLE |
| 64 | N | 1285 | 719 | 1176 | 938 | 2.0 | 591 | 11 | 50 | EXAMPLE |
| 65 | N | 1220 | 719 | 1089 | 967 | 3.3 | 643 | 14 | 50 | EXAMPLE |
| 66 | N | 1250 | 719 | 1162 | 947 | 3.2 | 651 | 14 | 50 | EXAMPLE |
| 67 | O | 1285 | 666 | 1118 | 924 | 3.1 | 610 | 13 | 67 | EXAMPLE |
| 68 | O | 1250 | 666 | 1163 | 890 | 2.8 | 588 | 14 | 67 | EXAMPLE |
| 69 | O | 1275 | 666 | 1130 | 950 | 1.9 | 632 | 13 | 67 | EXAMPLE |
| 70 | P | 1245 | 751 | 1171 | 967 | 2.0 | 609 | 14 | 50 | EXAMPLE |
| 71 | P | 1275 | 751 | 1065 | 961 | 2.3 | 610 | 12 | 50 | EXAMPLE |
| 72 | P | 1275 | 751 | 1074 | 933 | 2.8 | 539 | 11 | 50 | EXAMPLE |
| 73 | Q | 1240 | 712 | 1176 | 929 | 3.6 | 601 | 12 | 50 | EXAMPLE |
| 74 | Q | 1225 | 712 | 1060 | 964 | 2.6 | 656 | 13 | 50 | EXAMPLE |
| 75 | Q | 1220 | 712 | 1081 | 927 | 3.6 | 609 | 14 | 50 | EXAMPLE |
| 76 | R | 1270 | 624 | 1060 | 935 | 2.0 | 651 | 14 | 54 | EXAMPLE |
| 77 | R | 1240 | 624 | 1129 | 959 | 2.9 | 650 | 12 | 54 | EXAMPLE |
| 78 | R | 1245 | 624 | 1125 | 962 | 3.5 | 640 | 14 | 54 | EXAMPLE |
| 79 | S | 1250 | 693 | 1122 | 915 | 3.7 | 608 | 11 | 54 | EXAMPLE |
| 80 | S | 1270 | 693 | 1098 | 952 | 2.9 | 674 | 12 | 54 | EXAMPLE |
| 81 | S | 1220 | 693 | 1078 | 930 | 3.4 | 657 | 12 | 54 | EXAMPLE |
| 82 | T | 1285 | 743 | 1093 | 956 | 2.8 | 635 | 14 | 40 | EXAMPLE |
| 83 | T | 1245 | 743 | 1146 | 887 | 2.9 | 612 | 13 | 40 | EXAMPLE |
| 84 | T | 1235 | 743 | 1140 | 907 | 3.6 | 618 | 11 | 40 | EXAMPLE |
| 85 | U | 1240 | 675 | 1062 | 956 | 3.6 | 642 | 12 | 47 | EXAMPLE |
| 86 | U | 1230 | 675 | 1160 | 946 | 1.8 | 643 | 13 | 50 | EXAMPLE |
| 87 | U | 1235 | 675 | 1072 | 893 | 2.3 | 589 | 12 | 67 | EXAMPLE |
| 88 | V | 1270 | 655 | 1076 | 954 | 2.6 | 601 | 11 | 60 | EXAMPLE |
| 89 | V | 1260 | 655 | 1109 | 952 | 2.5 | 613 | 13 | 60 | EXAMPLE |
| 90 | V | 1235 | 655 | 1093 | 898 | 1.9 | 619 | 13 | 71 | EXAMPLE |
| 91 | W | 1245 | 740 | 1125 | 930 | 1.7 | 630 | 14 | 60 | EXAMPLE |
| 92 | W | 1225 | 740 | 1178 | 884 | 1.9 | 641 | 14 | 60 | EXAMPLE |
| 93 | W | 1260 | 740 | 1110 | 942 | 3.3 | 589 | 13 | 60 | EXAMPLE |
| 94 | X | 1275 | 693 | 1063 | 952 | 1.8 | 640 | 12 | 40 | EXAMPLE |
| 95 | X | 1230 | 693 | 1148 | 931 | 2.4 | 606 | 12 | 60 | EXAMPLE |
| 96 | X | 1225 | 693 | 1151 | 950 | 3.3 | 661 | 14 | 50 | EXAMPLE |
| 97 | Y | 1260 | 644 | 1135 | 912 | 2.1 | 597 | 11 | 50 | EXAMPLE |
| 98 | Y | 1275 | 644 | 1145 | 931 | 2.8 | 630 | 11 | 50 | EXAMPLE |
| 99 | Y | 1255 | 644 | 1092 | 969 | 2.6 | 596 | 11 | 50 | EXAMPLE |
| 100 | Z | 1280 | 599 | 1063 | 952 | 1.7 | 581 | 11 | 60 | EXAMPLE |

TABLE 6-continued

| EXPERI-MENTAL EXAMPLE | CHEMICAL COMPONENT | SLAB HEATING TEMPERATURE °C. | Ar₃ TRANSFORMATION POINT °C. | HOT ROLLING START TEMPERATURE °C. | FINISH HOT-ROLLING TEMPERATURE °C. | EXPRESSION 1 | COILING TEMPERATURE °C. | AVERAGE COOLING RATE °C./HOUR | COLD-ROLLING REDUCTION RATIO % | |
|---|---|---|---|---|---|---|---|---|---|---|
| 101 | Z | 1270 | 599 | 1083 | 907 | 2.6 | 611 | 13 | 60 | EXAMPLE |
| 102 | Z | 1245 | 599 | 1140 | 960 | 2.7 | 584 | 11 | 60 | EXAMPLE |
| 103 | AA | 1230 | 714 | 1160 | 968 | 2.4 | 586 | 11 | 50 | COMPARATIVE EXAMPLE |
| 104 | AB | 1280 | 720 | 1144 | 894 | 1.9 | 646 | 14 | 50 | COMPARATIVE EXAMPLE |
| 105 | AC | 1260 | 716 | 1080 | 887 | 3.3 | 674 | 13 | 50 | COMPARATIVE EXAMPLE |
| 106 | AD | 1265 | 717 | 1085 | 897 | 3.3 | 660 | 12 | 50 | COMPARATIVE EXAMPLE |
| 107 | AE | 1270 | 742 | 1075 | 897 | 3.5 | 602 | 13 | 50 | COMPARATIVE EXAMPLE |
| 108 | AF | 1285 | 723 | 1105 | 895 | 2.2 | 623 | 12 | 50 | COMPARATIVE EXAMPLE |

TABLE 7

| EXPERI-MENTAL EXAMPLE | CHEMICAL COMPONENT | SLAB HEATING TEMPERATURE °C. | Ar₃ TRANSFORMATION POINT °C. | HOT ROLLING START TEMPERATURE °C. | FINISH HOT-ROLLING TEMPERATURE °C. | EXPRESSION 1 | COILING TEMPERATURE °C. | AVERAGE COOLING RATE °C./HOUR | COLD-ROLLING REDUCTION RATIO % | |
|---|---|---|---|---|---|---|---|---|---|---|
| 201 | BA | 1245 | 643 | 1087 | 874 | 2.9 | 592 | 13 | 67 | EXAMPLE |
| 202 | BA | 1240 | 643 | 1090 | 895 | 3.2 | 604 | 14 | 67 | EXAMPLE |
| 203 | BB | 1240 | 710 | 1122 | 904 | 2.8 | 621 | 12 | 67 | EXAMPLE |
| 204 | BB | 1255 | 710 | 1095 | 881 | 3.1 | 610 | 11 | 67 | EXAMPLE |
| 205 | BC | 1255 | 722 | 1101 | 881 | 3.2 | 589 | 14 | 67 | EXAMPLE |
| 206 | BC | 1260 | 722 | 1099 | 908 | 2.8 | 591 | 11 | 67 | EXAMPLE |

Subsequently, annealing was applied under conditions shown in Table 8 to Table 11 to produce steel sheets of experimental examples 1 to 108, 201 to 208. In the annealing step, heating was performed in a temperature range of 550 to 700° C. at average heating rates shown in Table 6 to Table 8, and after heating to maximum heating temperatures shown in Table 8 to Table 11, cooling was performed in a temperature range of the maximum heating temperatures to 700° C. at average cooling rates (cooling rates 1) shown in Table 8 to Table 11, cooling was performed in a temperature range of 700 to 500° C. at average cooling rates (cooling rates 2) shown in Table 8 to Table 11, and a retention process for the retention times shown in Table 8 to Table 11 was performed in a temperature range of 350 to 450° C., followed by cooling to room temperature.

TABLE 8

| EXPERI-MENTAL EXAMPLE | CHEMICAL COMPONENT | STEEL TYPE | $Ac_1$ °C. | $Ac_3$ °C. | AVERAGE HEATING RATE °C./SECOND | MAXIMUM HEATING TEMPERATURE °C. | COOLING RATE 1 °C./SECOND | COOLING RATE 2 °C./SECOND | RETENTION TIME SECOND | ALLOYING TEMPERATURE °C. | |
|---|---|---|---|---|---|---|---|---|---|---|---|
| 1 | A | CR | 725 | 828 | 5 | 786 | 4.5 | 12.6 | 190 | | EXAMPLE |
| 2 | A | CR | 725 | 828 | 5 | 792 | 2.3 | 13.3 | 164 | | EXAMPLE |
| 3 | A | CR | 725 | 828 | 3 | 891 | 1.7 | 65.7 | 204 | | EXAMPLE |
| 4 | A | GA | 725 | 828 | 3 | 786 | 5.3 | 7.4 | 98 | 501 | EXAMPLE |
| 5 | A | CR | 725 | 828 | 3 | 807 | 5.5 | 11.2 | 218 | | COMPARATIVE EXAMPLE |
| 6 | B | CR | 714 | 834 | 2 | 800 | 1.7 | 12.6 | 333 | | EXAMPLE |
| 7 | B | CR | 714 | 834 | 2 | 805 | 1.3 | 6.8 | 345 | | EXAMPLE |
| 8 | B | CR | 714 | 834 | 2 | 809 | 4.9 | 9.1 | 70 | | EXAMPLE |
| 9 | B | GA | 714 | 834 | 5 | 795 | 3.6 | 9.6 | 324 | 532 | EXAMPLE |
| 10 | B | CR | 714 | 834 | 2 | 786 | 3.1 | 10.3 | 282 | | COMPARATIVE EXAMPLE |
| 11 | C | CR | 734 | 842 | 5 | 805 | 3.8 | 7.3 | 112 | | EXAMPLE |
| 12 | C | CR | 734 | 842 | 4 | 811 | 1.7 | 11.1 | 133 | | EXAMPLE |
| 13 | C | CR | 734 | 842 | 7 | 820 | 5.8 | 47.0 | 142 | | EXAMPLE |

TABLE 8-continued

| EXPERI-MENTAL EXAMPLE | CHEMICAL COMPONENT | STEEL TYPE | $Ac_1$ °C. | $Ac_3$ °C. | AVERAGE HEATING RATE °C./SECOND | MAXIMUM HEATING TEMPERATURE °C. | COOLING RATE 1 °C./SECOND | COOLING RATE 2 °C./SECOND | RETENTION TIME SECOND | ALLOYING TEMPERATURE °C. | |
|---|---|---|---|---|---|---|---|---|---|---|---|
| 14 | C | GA | 734 | 842 | 5 | 805 | 1.6 | 74.2 | 122 | 544 | EXAMPLE |
| 15 | C | CR | 734 | 842 | 4 | 818 | 2.4 | 13.3 | 136 | | COMPARATIVE EXAMPLE |
| 16 | D | CR | 717 | 777 | 4 | 764 | 1.7 | 9.8 | 184 | | EXAMPLE |
| 17 | D | CR | 717 | 777 | 5 | 763 | 4.9 | 13.2 | 158 | | EXAMPLE |
| 18 | D | CR | 717 | 777 | 3 | 815 | 4.6 | 11.6 | 176 | | EXAMPLE |
| 19 | D | GI | 717 | 777 | 9 | 809 | 1.8 | 5.4 | 207 | | EXAMPLE |
| 20 | D | CR | 717 | 777 | 5 | 764 | 5.6 | 8.0 | 144 | | COMPARATIVE EXAMPLE |
| 21 | E | CR | 715 | 830 | 5 | 796 | 2.3 | 111.0 | 315 | | EXAMPLE |
| 22 | E | CR | 715 | 830 | 2 | 784 | 1.9 | 12.6 | 403 | | EXAMPLE |
| 23 | E | CR | 715 | 830 | 7 | 796 | 4.5 | 7.2 | 61 | | EXAMPLE |
| 24 | E | GI | 715 | 830 | 4 | 790 | 9.1 | 6.9 | 322 | | EXAMPLE |
| 25 | E | CR | 715 | 830 | 4 | 801 | 6.0 | 12.0 | 280 | | COMPARATIVE EXAMPLE |
| 26 | F | CR | 725 | 834 | 2 | 799 | 5.0 | 7.2 | 648 | | EXAMPLE |
| 27 | F | CR | 725 | 834 | 7 | 795 | 4.3 | 8.3 | 312 | | EXAMPLE |
| 28 | F | CR | 725 | 834 | 2 | 824 | 4.7 | 9.3 | 314 | | EXAMPLE |
| 29 | F | GI | 725 | 834 | 7 | 817 | 3.8 | 8.1 | 462 | | EXAMPLE |
| 30 | F | CR | 725 | 834 | 6 | 793 | 3.4 | 9.3 | 102 | | COMPARATIVE EXAMPLE |

TABLE 9

| EXPERI-MENTAL EXAMPLE | CHEMICAL COMPONENT | STEEL TYPE | $Ac_1$ °C. | $Ac_3$ °C. | AVERAGE HEATING RATE °C./SECOND | MAXIMUM HEATING TEMPERATURE °C. | COOLING RATE 1 °C./SECOND | COOLING RATE 2 °C./SECOND | RETENTION TIME SECOND | ALLOYING TEMPERATURE °C. | |
|---|---|---|---|---|---|---|---|---|---|---|---|
| 31 | G | CR | 729 | 860 | 3 | 834 | 2.5 | 33.6 | 133 | | EXAMPLE |
| 32 | G | CR | 729 | 860 | 6 | 852 | 2.4 | 20.9 | 103 | | EXAMPLE |
| 33 | G | CR | 729 | 860 | 6 | 818 | 5.3 | 35.3 | 108 | | EXAMPLE |
| 34 | G | EG | 729 | 860 | 6 | 827 | 2.7 | 28.7 | 76 | | EXAMPLE |
| 35 | G | CR | 729 | 860 | <u>30</u> | 822 | 5.8 | 27.8 | 138 | | COMPARATIVE EXAMPLE |
| 36 | H | CR | 719 | 785 | 5 | 765 | 5.3 | 37.1 | 602 | | EXAMPLE |
| 37 | H | CR | 719 | 785 | 4 | 763 | 4.9 | 25.7 | 512 | | EXAMPLE |
| 38 | H | CR | 719 | 785 | 6 | 771 | 4.8 | 33.2 | 526 | | EXAMPLE |
| 39 | H | CR | 719 | 785 | 2 | 769 | 5.9 | 28.3 | 536 | | EXAMPLE |
| 40 | H | CR | 719 | 785 | 3 | <u>725</u> | 1.7 | 25.0 | 522 | | COMPARATIVE EXAMPLE |
| 41 | I | CR | 703 | 788 | 3 | 781 | 4.7 | 7.6 | 468 | | EXAMPLE |
| 42 | I | CR | 703 | 788 | 4 | 770 | 5.6 | 10.6 | 226 | | EXAMPLE |
| 43 | I | CR | 703 | 788 | 3 | 825 | 1.7 | 13.3 | 194 | | EXAMPLE |
| 44 | I | EG | 703 | 788 | 3 | 770 | 5.7 | 7.6 | 464 | | EXAMPLE |
| 45 | I | CR | 703 | 788 | 4 | 787 | <u>33.1</u> | 11.7 | 131 | | COMPARATIVE EXAMPLE |
| 46 | J | CR | 730 | 834 | 5 | 795 | 5.1 | 9.0 | 59 | | EXAMPLE |
| 47 | J | CR | 730 | 834 | 3 | 796 | 3.0 | 9.4 | 62 | | EXAMPLE |
| 48 | J | CR | 730 | 834 | 3 | 808 | 4.8 | 35.9 | 57 | | EXAMPLE |
| 49 | J | CR | 730 | 834 | 5 | 812 | 1.8 | 29.2 | 60 | | EXAMPLE |
| 50 | J | CR | 730 | 834 | 3 | 809 | <u>0.2</u> | 12.4 | 79 | | COMPARATIVE EXAMPLE |
| 51 | K | CR | 721 | 821 | 2 | 795 | 4.5 | 9.9 | 124 | | EXAMPLE |
| 52 | K | CR | 721 | 821 | 3 | 801 | 3.5 | 7.8 | 98 | | EXAMPLE |
| 53 | K | CR | 721 | 821 | 4 | 795 | 3.5 | 12.5 | 113 | | EXAMPLE |
| 54 | K | CR | 721 | 821 | 6 | 787 | 5.7 | 11.7 | <u>15</u> | | COMPARATIVE EXAMPLE |
| 55 | K | CR | 721 | 821 | 3 | 787 | 3.6 | 6.8 | <u>3600</u> | | COMPARATIVE EXAMPLE |
| 56 | L | CR | 738 | 844 | 2 | 818 | 5.6 | 9.8 | 234 | | EXAMPLE |
| 57 | L | CR | 738 | 844 | 2 | 803 | 4.2 | 5.8 | 204 | | EXAMPLE |
| 58 | L | GA | 738 | 844 | 5 | 801 | 5.5 | 12.5 | 196 | 481 | EXAMPLE |
| 59 | L | CR | 738 | 844 | 5 | 810 | 2.8 | 12.3 | 176 | | COMPARATIVE EXAMPLE |
| 60 | L | CR | 738 | 844 | 8 | 801 | 2.5 | <u>1.3</u> | 210 | | COMPARATIVE EXAMPLE |

TABLE 10

| EXPERI-MENTAL EXAMPLE | CHEMICAL COMPONENT | STEEL TYPE | $Ac_1$ °C. | $Ac_3$ °C. | AVERAGE HEATING RATE °C./SECOND | MAXIMUM HEATING TEMPERATURE °C. | COOLING RATE 1 °C./SECOND | COOLING RATE 2 °C./SECOND | RETENTION TIME SECOND | ALLOYING TEMPERATURE °C. | |
|---|---|---|---|---|---|---|---|---|---|---|---|
| 61 | M | CR | 710 | 807 | 6 | 782 | 4.8 | 31.7 | 525 | | EXAMPLE |
| 62 | M | CR | 710 | 807 | 3 | 774 | 3.8 | 12.6 | 470 | | EXAMPLE |
| 63 | M | CR | 710 | 807 | 7 | 768 | 3.7 | 12.0 | 445 | | EXAMPLE |
| 64 | N | CR | 745 | 865 | 6 | 833 | 1.6 | 20.7 | 142 | | EXAMPLE |
| 65 | N | CR | 745 | 865 | 3 | 839 | 2.8 | 11.3 | 139 | | EXAMPLE |
| 66 | N | CR | 745 | 865 | 2 | 820 | 5.3 | 13.3 | 112 | | EXAMPLE |
| 67 | O | CR | 707 | 793 | 2 | 766 | 4.0 | 31.9 | 237 | | EXAMPLE |
| 68 | O | CR | 707 | 793 | 5 | 767 | 4.2 | 24.6 | 209 | | EXAMPLE |
| 69 | O | CR | 707 | 793 | 4 | 770 | 4.2 | 33.4 | 74 | | EXAMPLE |
| 70 | P | CR | 736 | 837 | 4 | 817 | 5.8 | 7.8 | 74 | | EXAMPLE |
| 71 | P | CR | 736 | 837 | 3 | 828 | 1.8 | 10.1 | 83 | | EXAMPLE |
| 72 | P | GA | 736 | 837 | 4 | 812 | 4.6 | 11.4 | 62 | 519 | EXAMPLE |
| 73 | Q | CR | 738 | 875 | 3 | 922 | 6.6 | 7.7 | 498 | | EXAMPLE |
| 74 | Q | CR | 738 | 875 | 5 | 846 | 4.6 | 11.4 | 444 | | EXAMPLE |
| 75 | Q | GA | 738 | 875 | 7 | 842 | 4.9 | 7.8 | 125 | 499 | EXAMPLE |
| 76 | R | CR | 715 | 793 | 4 | 765 | 2.2 | 87.2 | 204 | | EXAMPLE |
| 77 | R | CR | 715 | 793 | 4 | 771 | 3.3 | 130.2 | 198 | | EXAMPLE |
| 78 | R | EG | 715 | 793 | 6 | 764 | 2.5 | 112.0 | 184 | | EXAMPLE |
| 79 | S | CR | 718 | 839 | 3 | 829 | 4.6 | 7.6 | 125 | | EXAMPLE |
| 80 | S | CR | 718 | 839 | 2 | 817 | 2.8 | 8.3 | 124 | | EXAMPLE |
| 81 | S | EG | 718 | 839 | 5 | 829 | 5.1 | 13.3 | 131 | | EXAMPLE |
| | T | CR | 724 | 850 | 3 | 842 | 8.0 | 25.9 | 57 | | EXAMPLE |
| 83 | T | CR | 724 | 850 | 6 | 834 | 3.3 | 35.2 | 101 | | EXAMPLE |
| 84 | T | GI | 724 | 850 | 6 | 839 | 2.7 | 38.8 | 126 | | EXAMPLE |
| 85 | U | CR | 727 | 835 | 3 | 812 | 3.6 | 79.4 | 118 | | EXAMPLE |
| 86 | U | CR | 727 | 835 | 5 | 801 | 5.7 | 87.6 | 138 | | EXAMPLE |
| 87 | U | GI | 727 | 835 | 3 | 795 | 3.9 | 61.9 | 121 | | EXAMPLE |
| 88 | V | CR | 717 | 832 | 6 | 806 | 1.6 | 42.3 | 340 | | EXAMPLE |
| 89 | V | CR | 717 | 832 | 3 | 803 | 3.3 | 84.0 | 364 | | EXAMPLE |
| 90 | V | CR | 717 | 832 | 3 | 786 | 3.8 | 67.5 | 400 | | EXAMPLE |
| 91 | W | CR | 728 | 840 | 7 | 803 | 5.9 | 78.4 | 98 | | EXAMPLE |
| 92 | W | CR | 728 | 840 | 2 | 799 | 5.9 | 54.6 | 121 | | EXAMPLE |
| 93 | W | CR | 728 | 840 | 4 | 813 | 1.8 | 49.8 | 143 | | EXAMPLE |
| 94 | X | CR | 712 | 844 | 3 | 824 | 2.7 | 7.2 | 240 | | EXAMPLE |
| 95 | X | CR | 712 | 844 | 5 | 815 | 5.6 | 9.0 | 282 | | EXAMPLE |
| 96 | X | CR | 712 | 844 | 3 | 904 | 1.3 | 12.8 | 252 | | EXAMPLE |
| 97 | Y | CR | 718 | 802 | 6 | 785 | 5.0 | 11.3 | 115 | | EXAMPLE |
| 98 | Y | CR | 718 | 802 | 4 | 776 | 2.1 | 10.9 | 114 | | EXAMPLE |
| 99 | Y | CR | 718 | 802 | 6 | 785 | 2.8 | 10.4 | 142 | | EXAMPLE |
| 100 | Z | CR | 696 | 768 | 5 | 739 | 4.5 | 11.9 | 255 | | EXAMPLE |
| 101 | Z | CR | 696 | 768 | 3 | 739 | 2.0 | 12.0 | 288 | | EXAMPLE |
| 102 | Z | CR | 696 | 768 | 7 | 747 | 2.8 | 13.0 | 270 | | EXAMPLE |
| 103 | AA | CR | 725 | 829 | 5 | 801 | 4.7 | 33.0 | 249 | | COMPARATIVE EXAMPLE |
| 104 | AB | CR | 724 | 854 | 5 | 804 | 2.2 | 28.2 | 342 | | COMPARATIVE EXAMPLE |
| 105 | AC | CR | 722 | 835 | 5 | 797 | 4.2 | 39.4 | 309 | | COMPARATIVE EXAMPLE |
| 106 | AD | CR | 721 | 851 | 5 | 804 | 4.7 | 28.0 | 267 | | COMPARATIVE EXAMPLE |
| 107 | AE | CR | 735 | 921 | 5 | 800 | 4.5 | 35.9 | 297 | | COMPARATIVE EXAMPLE |
| 108 | AF | CR | 718 | 835 | 5 | 800 | 4.1 | 34.0 | 300 | | COMPARATIVE EXAMPLE |

TABLE 11

| EXPERI-MENTAL EXAMPLE | CHEMICAL COMPONENT | STEEL TYPE | $Ac_1$ °C. | $Ac_3$ °C. | AVERAGE HEATING RATE °C./SECOND | MAXIMUM HEATING TEMPERATURE °C. | COOLING RATE 1 °C./SECOND | COOLING RATE 2 °C./SECOND | RETENTION TIME SECOND | ALLOYING TEMPERATURE °C. | |
|---|---|---|---|---|---|---|---|---|---|---|---|
| 201 | BA | CR | 695 | 849 | 3 | 823 | 2.2 | 23.3 | 86 | | EXAMPLE |
| 202 | BA | GA | 695 | 849 | 2 | 827 | 2.0 | 23.1 | 81 | 564 | EXAMPLE |
| 203 | BB | CR | 710 | 823 | 2 | 812 | 1.8 | 23.7 | 75 | | EXAMPLE |
| 204 | BB | GI | 710 | 823 | 3 | 810 | 2.1 | 24.7 | 77 | | EXAMPLE |
| 205 | BC | CR | 708 | 842 | 2 | 828 | 2.2 | 25.5 | 80 | | EXAMPLE |
| 206 | BC | EG | 708 | 842 | 2 | 830 | 2.4 | 22.6 | 87 | | EXAMPLE |

After the cooling to room temperature, 0.15% cold rolling was applied in the experimental examples 6 to 20 and the experimental examples 70 to 108, 1.50% cold rolling was applied in the experimental example 23, 1.00% cold rolling was applied in the experimental example 28, and 0.25% cold rolling was applied in the experimental examples 31 to 55.

Further, in the experimental examples 34, 44, 78, 81, after the annealing step, electroplating was applied on an electroplating line to produce electrogalvanized steel sheets.

In the experimental examples 19, 24, 84, after the cooling to 500° C. at the cooling rates 2, immersion in a galvanizing bath was performed during a period up to the cooling to the temperature range of 350 to 450° C., thereby producing a hot-dip galvanized steel sheet.

Further, in the experimental examples 29, 87, after the retention process in the temperature range of 350 to 450° C., immersion in a galvanizing bath was performed and then cooling to room temperature was performed, thereby producing a hot-dip galvanized steel sheet.

In the experimental examples 4, 14, 75, after the cooling to 500° C. at the cooling rates 2, immersion in a galvanizing bath was performed during a period up to the cooling to the temperature range of 350 to 450° C., and an alloying process was applied by 30 second retention at alloying temperatures shown in Table 8 to Table 11, thereby producing alloyed hot-dip galvanized steel sheets.

Further, in the experimental examples 9, 58, 72, immersion in a galvanizing bath was performed after the retention process in the temperature range of 350 to 450° C., and further an alloying process was applied by 30 second retention at alloying temperatures shown in Table 8 to Table 11, thereby producing alloyed hot-dip galvanized steel sheets.

Further, in the experimental examples 14 and 72, a coating film made of a composite oxide containing phosphorus was applied on a surface of a galvanized layer.

In Table 8 to Table 11, "CR" means a cold-rolled steel sheet, "GA" means an alloyed hot-dip galvanized steel sheet, "GI" means a hot-dip galvanized steel sheet, and "EG" means an electrogalvanized steel sheet.

Microstructures in a 1/8 thickness to 3/8 thickness region in each of the steel sheets of the experimental examples 1 to 108, 201 to 208 were observed and their volume fractions were measured. The results thereof are shown in Table 12 to Table 15. In Table 12 to Table 15, "F" means ferrite, "B" means bainite, "BF" means bainitic ferrite, "TM" means tempered martensite, "M" means fresh martensite, and "retained γ" means retained austenite.

A thicknesswise cross section was cut out, and an amount of the retained austenite out of the microstructure fractions was measured by an electron back scattering diffraction (EBSD) analyzer attached to a field emission scanning electron microscope (FE-SEM) in the mirror-polished cross section, and the others were found by nital-etching the mirror-polished cross section and observing the cross section by using FE-SEM.

TABLE 12

| EXPERI-MENTAL EXAMPLE | COLD-ROLLED STEEL SHEET | STEEL TYPE | MICROSTRUCTURE OBSERVATION RESULT | | | | | | | PRECIPITATES | | COMPONENT ANALYSIS RESULT $W_{Mn\gamma}/W_{Mn}$ | |
|---|---|---|---|---|---|---|---|---|---|---|---|---|---|
| | | | VOLUME FRACTION | | | | | | | | | | |
| | | | F % | B % | BF % | TM % | M % | RETAINED γ % | OTHERS % | SHAPE γ ASPECT RATIO | TiN AVERAGE SIZE μm | AlN DENSITY PIECES/ mm² | |
| 1 | A | CR | 54 | 10 | 19 | 11 | 1 | 5 | 0 | 1.1 | 0.3 | 0.8 | 1.33 | EXAMPLE |
| 2 | A | CR | 49 | 7 | 25 | 10 | 3 | 5 | 1 | 1.6 | 0.2 | 0.6 | 1.35 | EXAMPLE |
| 3 | A | CR | 29 | 8 | 37 | 21 | 1 | 4 | 0 | 1.4 | 0.2 | 0.5 | 1.17 | EXAMPLE |
| 4 | A | GA | 54 | 7 | 18 | 15 | 0 | 4 | 2 | 1.4 | 0.3 | 0.8 | 1.31 | EXAMPLE |
| 5 | A | CR | 29 | 13 | 26 | 29 | 0 | 3 | 0 | 1.5 | <u>4.2</u> | 0.4 | 1.29 | COMPARATIVE EXAMPLE |
| 6 | B | CR | 38 | 22 | 10 | 22 | 0 | 7 | 1 | 1.2 | 0.1 | 0.5 | 1.23 | EXAMPLE |
| 7 | B | CR | 37 | 10 | 28 | 18 | 1 | 5 | 1 | 1.8 | 0.2 | 0.2 | 1.27 | EXAMPLE |
| 8 | B | CR | 28 | 15 | 23 | 26 | 2 | 6 | 0 | 1.5 | 0.4 | 0.2 | 1.23 | EXAMPLE |
| 9 | B | GA | 46 | 24 | 15 | 9 | 1 | 5 | 0 | 1.5 | 0.2 | 0.8 | 1.27 | EXAMPLE |
| 10 | B | CR | 54 | 18 | 9 | 14 | 1 | 4 | 0 | 1.7 | <u>0.8</u> | 0.4 | 1.29 | COMPARATIVE EXAMPLE |
| 11 | C | CR | 45 | 15 | 25 | 10 | 0 | 3 | 2 | 1.3 | 0.2 | 0.5 | 1.25 | EXAMPLE |
| 12 | C | CR | 44 | 20 | 9 | 20 | 0 | 5 | 2 | 1.4 | 0.5 | 0.7 | 1.25 | EXAMPLE |
| 13 | C | CR | 26 | 24 | 21 | 24 | 2 | 3 | 0 | 1.4 | 0.2 | 0.2 | 1.27 | EXAMPLE |
| 14 | C | GA | 45 | 12 | 11 | 27 | 2 | 3 | 0 | 1.2 | 0.5 | 0.3 | 1.31 | EXAMPLE |
| 15 | C | CR | 33 | 21 | 22 | 22 | 1 | 1 | 0 | 1.5 | 0.5 | 0.3 | 1.37 | COMPARATIVE EXAMPLE |
| 16 | D | CR | 32 | 17 | 28 | 18 | 0 | 3 | 2 | 1.8 | 0.3 | 0.2 | 1.57 | EXAMPLE |
| 17 | D | CR | 36 | 22 | 23 | 16 | 0 | 2 | 1 | 1.1 | 0.1 | 0.3 | 1.52 | EXAMPLE |
| 18 | D | CR | 20 | 30 | 17 | 30 | 1 | 2 | 0 | 1.7 | 0.1 | 0.6 | 1.37 | EXAMPLE |
| 19 | D | GI | 21 | 29 | 31 | 15 | 0 | 3 | 1 | 1.2 | 0.2 | 0.8 | 1.23 | EXAMPLE |
| 20 | D | CR | 33 | 9 | 27 | 25 | 1 | 4 | 1 | 1.1 | 0.2 | 0.2 | 1.71 | COMPARATIVE EXAMPLE |
| 21 | E | CR | 42 | 19 | 10 | 23 | 3 | 3 | 0 | 1.3 | 0.3 | 0.3 | 1.35 | EXAMPLE |
| 22 | E | CR | 48 | 22 | 12 | 13 | 1 | 3 | 1 | 1.7 | 0.1 | 0.4 | 1.23 | EXAMPLE |
| 23 | E | CR | 36 | 17 | 21 | 25 | 0 | 1 | 0 | 1.7 | 0.2 | 0.5 | 1.33 | EXAMPLE |
| 24 | E | GI | 38 | 20 | 22 | 16 | 0 | 2 | 2 | 1.1 | 0.1 | 0.4 | 1.39 | EXAMPLE |

TABLE 12-continued

| | | | MICROSTRUCTURE OBSERVATION RESULT | | | | | | | | COMPONENT ANALYSIS RESULT $W_{Mn\gamma}/W_{Mn}$ | |
|---|---|---|---|---|---|---|---|---|---|---|---|---|---|
| | | | VOLUME FRACTION | | | | | | | PRECIPITATES | | | |
| EXPERIMENTAL EXAMPLE | COLD-ROLLED STEEL SHEET | STEEL TYPE | F % | B % | BF % | TM % | M % | RETAINED γ % | OTHERS % | SHAPE γ ASPECT RATIO | TiN AVERAGE SIZE μm | AlN DENSITY PIECES/mm² | |
| 25 | E | CR | 34 | 28 | 17 | 16 | 1 | 3 | 1 | 1.3 | 0.3 | 0.5 | <u>1.05</u> | COMPARATIVE EXAMPLE |
| 26 | F | CR | 44 | 9 | 21 | 19 | 0 | 7 | 0 | 1.3 | 0.2 | 0.3 | 1.25 | EXAMPLE |
| 27 | F | CR | 47 | 17 | 15 | 15 | 0 | 6 | 0 | 1.7 | 0.3 | 0.8 | 1.29 | EXAMPLE |
| 28 | F | CR | 15 | 17 | 33 | 29 | 0 | 6 | 0 | 1.2 | 0.2 | 0.5 | 1.21 | EXAMPLE |
| 29 | F | GI | 24 | 25 | 27 | 19 | 0 | 4 | 1 | 1.2 | 0.4 | 0.2 | 1.37 | EXAMPLE |

TABLE 13

| | | | MICROSTRUCTURE OBSERVATION RESULT | | | | | | | | COMPONENT ANALYSIS RESULT $W_{Mn\gamma}/W_{Mn}$ | |
|---|---|---|---|---|---|---|---|---|---|---|---|---|---|
| | | | VOLUME FRACTION | | | | | | | PRECIPITATES | | | |
| EXPERIMENTAL EXAMPLE | COLD-ROLLED STEEL SHEET | STEEL TYPE | F % | B % | BF % | TM % | M % | RETAINED γ % | OTHERS % | SHAPE γ ASPECT RATIO | TiN AVERAGE SIZE μm | AlN DENSITY PIECES/mm² | |
| 30 | F | CR | 50 | 17 | 11 | 15 | 1 | 5 | 1 | <u>2.5</u> | 0.1 | 0.8 | 1.35 | COMPARATIVE EXAMPLE |
| 31 | G | CR | 29 | 16 | 19 | 30 | 2 | 4 | 0 | 1.2 | 0.4 | 0.3 | 1.15 | EXAMPLE |
| 32 | G | CR | 15 | 31 | 22 | 27 | 0 | 4 | 1 | 1.7 | 0.1 | 0.2 | 1.17 | EXAMPLE |
| 33 | G | CR | 41 | 23 | 18 | 14 | 0 | 3 | 1 | 1.1 | 0.4 | 0.4 | 1.19 | EXAMPLE |
| 34 | G | EG | 36 | 25 | 22 | 12 | 0 | 5 | 0 | 1.5 | 0.2 | 0.7 | 1.17 | EXAMPLE |
| 35 | G | CR | 37 | 27 | 14 | 15 | 1 | 6 | 0 | <u>2.3</u> | 0.3 | 0.3 | 1.21 | COMPARATIVE EXAMPLE |
| 36 | H | CR | 42 | 20 | 13 | 21 | 0 | 4 | 0 | 1.3 | 0.4 | 0.8 | 1.37 | EXAMPLE |
| 37 | H | CR | 42 | 20 | 16 | 17 | 1 | 3 | 1 | 1.8 | 0.2 | 0.5 | 1.27 | EXAMPLE |
| 38 | H | CR | 28 | 28 | 9 | 28 | 1 | 5 | 1 | 1.2 | 0.1 | 0.7 | 1.48 | EXAMPLE |
| 39 | H | CR | 33 | 14 | 26 | 22 | 0 | 5 | 0 | 1.5 | 0.3 | 0.8 | 1.52 | EXAMPLE |
| 40 | H | CR | 83 | 0 | 0 | 0 | 0 | 2 | 15 | 1.4 | 0.2 | 0.4 | 1.76 | COMPARATIVE EXAMPLE |
| 41 | I | CR | 14 | 30 | 14 | 37 | 3 | 2 | 0 | 1.2 | 0.3 | 0.5 | 1.30 | EXAMPLE |
| 42 | I | CR | 30 | 20 | 19 | 26 | 2 | 3 | 0 | 1.5 | 0.1 | 0.6 | 1.50 | EXAMPLE |
| 43 | I | CR | 14 | 34 | 15 | 33 | 2 | 2 | 0 | 1.2 | 0.2 | 0.5 | 1.27 | EXAMPLE |
| 44 | I | EG | 32 | 22 | 25 | 18 | 0 | 1 | 2 | 1.4 | 0.4 | 0.4 | 1.48 | EXAMPLE |
| 45 | I | CR | 4 | 27 | 46 | 18 | 0 | 4 | 1 | 1.5 | 0.1 | 0.7 | 1.25 | COMPARATIVE EXAMPLE |
| 46 | J | CR | 37 | 14 | 16 | 26 | 2 | 5 | 0 | 1.1 | 0.3 | 0.7 | 1.27 | EXAMPLE |
| 47 | J | CR | 39 | 21 | 13 | 19 | 0 | 6 | 2 | 1.3 | 0.3 | 0.4 | 1.21 | EXAMPLE |
| 48 | J | CR | 26 | 18 | 25 | 24 | 1 | 5 | 1 | 1.3 | 0.4 | 0.3 | 1.23 | EXAMPLE |
| 49 | J | CR | 28 | 10 | 25 | 31 | 0 | 5 | 1 | 1.4 | 0.2 | 0.5 | 1.37 | EXAMPLE |
| 50 | J | CR | 30 | 22 | 19 | 19 | 0 | 3 | 7 | 1.4 | 0.3 | 0.8 | 1.29 | COMPARATIVE EXAMPLE |
| 51 | K | CR | 29 | 18 | 24 | 23 | 2 | 4 | 0 | 1.2 | 0.4 | 0.4 | 1.27 | EXAMPLE |
| 52 | K | CR | 22 | 31 | 16 | 27 | 0 | 3 | 1 | 1.3 | 0.4 | 0.8 | 1.27 | EXAMPLE |
| 53 | K | CR | 24 | 30 | 15 | 29 | 0 | 2 | 0 | 1.7 | 0.4 | 0.5 | 1.35 | EXAMPLE |
| 54 | K | CR | 30 | 26 | 12 | 18 | 13 | <u>0</u> | 1 | — | 0.4 | 0.8 | — | COMPARATIVE EXAMPLE |
| 55 | K | CR | 37 | 24 | 19 | 13 | 0 | <u>0</u> | 7 | — | 0.2 | 0.7 | — | COMPARATIVE EXAMPLE |
| 56 | L | CR | 31 | 25 | 29 | 9 | 1 | 5 | 0 | 1.7 | 0.2 | 0.6 | 1.29 | EXAMPLE |
| 57 | L | CR | 46 | 13 | 8 | 27 | 2 | 4 | 0 | 1.7 | 0.1 | 0.2 | 1.35 | EXAMPLE |
| 58 | L | GA | 49 | 19 | 15 | 13 | 1 | 3 | 0 | 1.6 | 0.3 | 0.2 | 1.21 | EXAMPLE |
| 59 | L | CR | 42 | 9 | 22 | 21 | 1 | 5 | 0 | 1.6 | 0.1 | <u>2.5</u> | 1.27 | COMPARATIVE EXAMPLE |

TABLE 14

| | | | MICROSTRUCTURE OBSERVATION RESULT | | | | | | | | | | COMPONENT ANALYSIS RESULT $W_{Mn\gamma}/W_{Mn}$ | |
|---|---|---|---|---|---|---|---|---|---|---|---|---|---|---|
| | | | VOLUME FRACTION | | | | | | | SHAPE | PRECIPITATES | | | |
| EXPERIMENTAL EXAMPLE | COLD-ROLLED STEEL SHEET | STEEL TYPE | F % | B % | BF % | TM % | M % | RETAINED γ % | OTHERS % | γ ASPECT RATIO | TiN AVERAGE SIZE μm | AlN DENSITY PIECES/ mm² | | |
| 60 | L | CR | 55 | 16 | 8 | 6 | 3 | 3 | 9 | 1.5 | 0.2 | 0.5 | 1.29 | COMPARATIVE EXAMPLE |
| 61 | M | CR | 31 | 22 | 19 | 22 | 0 | 5 | 1 | 1.4 | 0.4 | 0.4 | 1.37 | EXAMPLE |
| 62 | M | CR | 41 | 19 | 21 | 11 | 1 | 6 | 1 | 1.4 | 0.4 | 0.8 | 1.37 | EXAMPLE |
| 63 | M | CR | 44 | 13 | 20 | 15 | 2 | 6 | 0 | 1.3 | 0.3 | 0.2 | 1.29 | EXAMPLE |
| 64 | N | CR | 35 | 11 | 26 | 22 | 0 | 6 | 0 | 1.3 | 0.1 | 0.4 | 1.15 | EXAMPLE |
| 65 | N | CR | 29 | 32 | 11 | 22 | 0 | 5 | 1 | 1.2 | 0.4 | 0.8 | 1.11 | EXAMPLE |
| 66 | N | CR | 50 | 11 | 18 | 12 | 2 | 7 | 0 | 1.4 | 0.3 | 0.7 | 1.19 | EXAMPLE |
| 67 | O | CR | 42 | 24 | 16 | 13 | 1 | 3 | 1 | 1.4 | 0.5 | 0.8 | 1.44 | EXAMPLE |
| 68 | O | CR | 40 | 25 | 8 | 23 | 1 | 2 | 1 | 1.3 | 0.3 | 0.6 | 1.31 | EXAMPLE |
| 69 | O | CR | 41 | 18 | 17 | 21 | 1 | 2 | 0 | 1.7 | 0.1 | 0.5 | 1.35 | EXAMPLE |
| 70 | P | CR | 32 | 9 | 22 | 28 | 3 | 5 | 1 | 1.5 | 0.2 | 0.4 | 1.19 | EXAMPLE |
| 71 | P | CR | 15 | 3 | 31 | 46 | 2 | 3 | 0 | 1.2 | 0.4 | 0.4 | 1.27 | EXAMPLE |
| 72 | P | GA | 34 | 6 | 15 | 37 | 3 | 5 | 0 | 1.5 | 0.3 | 0.2 | 1.25 | EXAMPLE |
| 73 | Q | CR | 16 | 26 | 28 | 24 | 0 | 5 | 1 | 1.3 | 0.3 | 0.7 | 1.15 | EXAMPLE |
| 74 | Q | CR | 34 | 16 | 18 | 25 | 0 | 6 | 1 | 1.2 | 0.1 | 0.5 | 1.15 | EXAMPLE |
| 75 | Q | GA | 33 | 18 | 28 | 17 | 1 | 3 | 0 | 1.5 | 0.4 | 0.6 | 1.11 | EXAMPLE |
| 76 | R | CR | 49 | 19 | 19 | 5 | 1 | 6 | 1 | 1.2 | 0.2 | 0.5 | 1.44 | EXAMPLE |
| 77 | R | CR | 36 | 21 | 22 | 13 | 4 | 4 | 0 | 1.5 | 0.5 | 0.8 | 1.41 | EXAMPLE |
| 78 | R | EG | 49 | 8 | 20 | 16 | 0 | 5 | 2 | 1.5 | 0.5 | 0.4 | 1.35 | EXAMPLE |
| 79 | S | CR | 13 | 35 | 21 | 23 | 0 | 6 | 2 | 1.5 | 0.4 | 0.5 | 1.29 | EXAMPLE |
| 80 | S | CR | 28 | 15 | 30 | 24 | 0 | 3 | 0 | 1.5 | 0.1 | 0.7 | 1.25 | EXAMPLE |
| 81 | S | EG | 12 | 25 | 27 | 28 | 0 | 6 | 2 | 1.1 | 0.4 | 0.4 | 1.29 | EXAMPLE |
| 82 | T | CR | 11 | 31 | 26 | 26 | 0 | 5 | 1 | 1.8 | 0.4 | 0.2 | 1.13 | EXAMPLE |
| 83 | T | CR | 22 | 33 | 17 | 22 | 1 | 4 | 1 | 1.3 | 0.4 | 0.2 | 1.25 | EXAMPLE |
| 84 | T | GI | 16 | 36 | 18 | 26 | 0 | 3 | 1 | 1.7 | 0.4 | 0.3 | 1.27 | EXAMPLE |
| 85 | U | CR | 32 | 18 | 32 | 11 | 0 | 5 | 2 | 1.4 | 0.4 | 0.2 | 1.25 | EXAMPLE |
| 86 | U | CR | 39 | 17 | 24 | 15 | 0 | 5 | 0 | 1.7 | 0.3 | 0.5 | 1.19 | EXAMPLE |
| 87 | U | GI | 47 | 16 | 16 | 15 | 1 | 5 | 0 | 1.1 | 0.1 | 0.3 | 1.29 | EXAMPLE |
| 88 | V | CR | 32 | 36 | 10 | 16 | 1 | 5 | 0 | 1.7 | 0.2 | 0.7 | 1.31 | EXAMPLE |
| 89 | V | CR | 33 | 10 | 30 | 18 | 0 | 7 | 2 | 1.6 | 0.3 | 0.2 | 1.19 | EXAMPLE |
| 90 | V | CR | 51 | 18 | 6 | 18 | 2 | 5 | 0 | 1.6 | 0.1 | 0.7 | 1.31 | EXAMPLE |
| 91 | W | CR | 46 | 9 | 25 | 16 | 0 | 3 | 1 | 1.5 | 0.1 | 0.7 | 1.19 | EXAMPLE |
| 92 | W | CR | 49 | 21 | 10 | 15 | 1 | 4 | 0 | 1.2 | 0.3 | 0.5 | 1.25 | EXAMPLE |
| 93 | W | CR | 33 | 27 | 24 | 11 | 1 | 3 | 1 | 1.7 | 0.4 | 0.6 | 1.25 | EXAMPLE |
| 94 | X | CR | 24 | 30 | 27 | 13 | 2 | 4 | 0 | 1.3 | 0.1 | 0.2 | 1.27 | EXAMPLE |
| 95 | X | CR | 28 | 14 | 28 | 25 | 0 | 3 | 2 | 1.3 | 0.3 | 0.2 | 1.29 | EXAMPLE |
| 96 | X | CR | 15 | 30 | 26 | 22 | 1 | 6 | 0 | 1.3 | 0.4 | 0.3 | 1.11 | EXAMPLE |
| 97 | Y | CR | 22 | 31 | 29 | 11 | 0 | 6 | 1 | 1.5 | 0.2 | 0.6 | 1.48 | EXAMPLE |
| 98 | Y | CR | 35 | 17 | 27 | 14 | 2 | 5 | 0 | 1.7 | 0.4 | 0.6 | 1.50 | EXAMPLE |
| 99 | Y | CR | 23 | 26 | 28 | 18 | 1 | 3 | 1 | 1.7 | 0.1 | 0.7 | 1.35 | EXAMPLE |
| 100 | Z | CR | 52 | 12 | 12 | 16 | 2 | 6 | 0 | 1.1 | 0.1 | 0.3 | 1.57 | EXAMPLE |
| 101 | Z | CR | 50 | 10 | 20 | 13 | 1 | 5 | 1 | 1.1 | 0.3 | 0.6 | 1.55 | EXAMPLE |
| 102 | Z | CR | 42 | 15 | 23 | 12 | 1 | 6 | 1 | 1.2 | 0.1 | 0.8 | 1.64 | EXAMPLE |
| 103 | AA | CR | 37 | 20 | 13 | 24 | 1 | 5 | 0 | 1.3 | 0.0 | 4.6 | 1.27 | COMPARATIVE EXAMPLE |
| 104 | AB | CR | 53 | 11 | 12 | 19 | 0 | 3 | 2 | 1.7 | 0.7 | 0.3 | 1.25 | COMPARATIVE EXAMPLE |
| 105 | AC | CR | 45 | 27 | 9 | 12 | 0 | 6 | 1 | 1.3 | 0.4 | 5.2 | 1.25 | COMPARATIVE EXAMPLE |
| 106 | AD | CR | 43 | 14 | 19 | 20 | 1 | 3 | 0 | 1.4 | 0.3 | 5.7 | 1.21 | COMPARATIVE EXAMPLE |
| 107 | AE | CR | 74 | 8 | 6 | 5 | 1 | 6 | 0 | 1.7 | 0.3 | 1.8 | 1.11 | COMPARATIVE EXAMPLE |
| 108 | AF | CR | 38 | 25 | 12 | 18 | 0 | 6 | 1 | 1.3 | 1.3 | 3.0 | 1.27 | COMPARATIVE EXAMPLE |

TABLE 15

| EXPERI-MENTAL EXAMPLE | COLD-ROLLED STEEL SHEET | STEEL TYPE | MICROSTRUCTURE OBSERVATION RESULT ||||||| PRECIPITATES || COMPONENT ANALYSIS RESULT WMnγ/WMn | |
|---|---|---|---|---|---|---|---|---|---|---|---|---|---|---|
| | | | VOLUME FRACTION ||||||| SHAPE γ ASPECT RATIO | TiN AVERAGE SIZE μm | AlN DENSITY PIECES/mm² | | |
| | | | F % | B % | BF % | TM % | M % | RETAINED γ % | OTHERS % | | | | | |
| 201 | BA | CR | 63 | 4 | 20 | 12 | 6 | 6 | 0 | 1.7 | 0.3 | 0.6 | 1.38 | EXAMPLE |
| 202 | BA | GA | 64 | 13 | 17 | 8 | 2 | 4 | 1 | 1.8 | 0.2 | 0.7 | 1.35 | EXAMPLE |
| 203 | BB | CR | 62 | 3 | 13 | 11 | 6 | 3 | 0 | 1.9 | 0.3 | 0.7 | 1.49 | EXAMPLE |
| 204 | BB | GI | 61 | 17 | 4 | 11 | 3 | 3 | 1 | 1.6 | 0.4 | 0.7 | 1.46 | EXAMPLE |
| 205 | BC | CR | 67 | 18 | 2 | 16 | 4 | 3 | 0 | 1.6 | 0.3 | 0.6 | 1.40 | EXAMPLE |
| 206 | BC | EG | 67 | 18 | 4 | 18 | 0 | 2 | 0 | 1.6 | 0.2 | 0.6 | 1.39 | EXAMPLE |

Further, as an average aspect ratio of the retained austenite (γ) (γ aspect ratio), measurement results of aspect ratios of 20 largest retained austenites in a retained austenite map obtained by the aforesaid EBSD analyzer and measurement results of aspect ratios of 20 largest retained austenites obtained by the similar EBSD analysis of a test piece fabricated for the observation of a ¼ thickness surface parallel to a sheet surface were added, and an average value of the aspect ratios of the 40 retained austenites was found.

Further, as an average grain diameter of TiN grains (TiN average size), a sample for transmission electron microscope (TEM) was fabricated by an extraction replica method from the surface where the volume fractions of the microstructures were observed, grain diameters (circle-equivalent diameters) of 10 TiN were measured by TEM, and an average value thereof was found.

As the density of AlN grains having a 1 μm grain diameter or more, inclusions in a 10.0 mm² range were observed by FE-SEM in the surface where the volume fractions of the microstructures were observed, the composition of inclusions whose circle-equivalent diameter was over 1.0 μm was measured, the number of inclusions confirmed as MN was counted, and the density was found.

A ratio (WMnγ/WMn) of an amount of solid-solution Mn (WMnγ) in the retained austenite to an average amount of Mn (WMn) was found by measuring WMn and WMnγ by the following method.

Specifically, in the observation surface where the microstructure fractions were found, EPMA analysis was conducted in the same range as that of the EBSD analysis, WMn was found from an obtained Mn concentration map, and the Mn concentration map and the retained austenite map were further laid one on the other, whereby only measurement values of the Mn concentration in the retained austenite was extracted, and WMNγ was obtained as an average value thereof.

Table 16 to Table 19 show results obtained when properties of the steel sheets of the experimental examples 1 to 108, 201 to 208 were evaluated by the following method.

From the steel sheets of the experimental examples 1 to 108, 201 to 208, tensile test pieces conforming to JIS Z 2201 were picked up, a tensile test was conducted in conformity with JIS Z 2241, and yield stress "YS", tensile strength "TS", and total elongation "EL" were measured.

Further, a hole expansion test (JFST1001) for evaluating flangeability was conducted, and a hole expansion limit value "λ" which is an index of stretch flangeability was calculated.

Further, the same tensile test piece was immersed in alcohol in which liquid nitrogen was added, was cooled to −60° C., taken out, and immediately subjected to the tensile test, and a drawing ratio (drawing value) of its fractured portion was found.

TABLE 16

| EXPERIMENTAL EXAMPLE | COLD-ROLLED STEEL SHEET | STEEL TYPE | MATERIAL QUALITY MEASUREMENT RESULT ||||| |
|---|---|---|---|---|---|---|---|---|
| | | | YS MPa | TS MPa | EL % | λ % | DRAWING VALUE % | |
| 1 | A | CR | 614 | 1114 | 21 | 49 | 34 | EXAMPLE |
| 2 | A | CR | 570 | 995 | 21 | 48 | 29 | EXAMPLE |
| 3 | A | CR | 783 | 1040 | 18 | 54 | 42 | EXAMPLE |
| 4 | A | GA | 627 | 1082 | 22 | 49 | 29 | EXAMPLE |
| 5 | A | CR | 864 | 1062 | 22 | 46 | 6 | COMPARATIVE EXAMPLE |
| 6 | B | CR | 801 | 1087 | 21 | 48 | 46 | EXAMPLE |
| 7 | B | CR | 800 | 1196 | 21 | 42 | 36 | EXAMPLE |
| 8 | B | CR | 811 | 1050 | 22 | 50 | 32 | EXAMPLE |
| 9 | B | GA | 672 | 998 | 24 | 51 | 47 | EXAMPLE |
| 10 | B | CR | 591 | 1032 | 23 | 38 | 11 | COMPARATIVE EXAMPLE |
| 11 | C | CR | 680 | 1116 | 18 | 51 | 43 | EXAMPLE |
| 12 | C | CR | 662 | 1099 | 23 | 36 | 35 | EXAMPLE |
| 13 | C | CR | 921 | 1116 | 19 | 52 | 28 | EXAMPLE |
| 14 | C | GA | 742 | 1093 | 19 | 54 | 28 | EXAMPLE |
| 15 | C | CR | 786 | 1118 | 8 | 8 | 7 | COMPARATIVE EXAMPLE |
| 16 | D | CR | 761 | 1069 | 22 | 44 | 46 | EXAMPLE |

TABLE 16-continued

| EXPERIMENTAL EXAMPLE | COLD-ROLLED STEEL SHEET | STEEL TYPE | MATERIAL QUALITY MEASUREMENT RESULT | | | | | |
|---|---|---|---|---|---|---|---|---|
| | | | YS MPa | TS MPa | EL % | λ % | DRAWING VALUE % | |
| 17 | D | CR | 760 | 1082 | 20 | 40 | 31 | EXAMPLE |
| 18 | D | CR | 908 | 1060 | 24 | 44 | 35 | EXAMPLE |
| 19 | D | GI | 800 | 940 | 24 | 42 | 29 | EXAMPLE |
| 20 | D | CR | 750 | 995 | 11 | 13 | 11 | COMPARATIVE EXAMPLE |
| 21 | E | CR | 684 | 997 | 25 | 44 | 32 | EXAMPLE |
| 22 | E | CR | 648 | 1034 | 21 | 29 | 26 | EXAMPLE |
| 23 | E | CR | 712 | 984 | 24 | 34 | 32 | EXAMPLE |
| 24 | E | GI | 747 | 1008 | 22 | 42 | 46 | EXAMPLE |
| 25 | E | CR | 770 | 1023 | 25 | 28 | 13 | COMPARATIVE EXAMPLE |
| 26 | F | CR | 918 | 1345 | 18 | 45 | 44 | EXAMPLE |
| 27 | F | CR | 794 | 1357 | 16 | 44 | 30 | EXAMPLE |
| 28 | F | CR | 1147 | 1338 | 18 | 45 | 32 | EXAMPLE |
| 29 | F | GI | 1008 | 1294 | 17 | 48 | 41 | EXAMPLE |
| 30 | F | CR | 776 | 1223 | 20 | 50 | 15 | COMPARATIVE EXAMPLE |

TABLE 17

| EXPERIMENTAL EXAMPLE | COLD-ROLLED STEEL SHEET | STEEL TYPE | MATERIAL QUALITY MEASUREMENT RESULT | | | | | |
|---|---|---|---|---|---|---|---|---|
| | | | YS MPa | TS MPa | EL % | λ % | DRAWING VALUE % | |
| 31 | G | CR | 731 | 961 | 24 | 61 | 48 | EXAMPLE |
| 32 | G | CR | 922 | 1065 | 22 | 51 | 37 | EXAMPLE |
| 33 | G | CR | 696 | 1029 | 24 | 41 | 30 | EXAMPLE |
| 34 | G | EG | 708 | 1032 | 23 | 48 | 39 | EXAMPLE |
| 35 | G | CR | 737 | 1074 | 20 | 40 | 13 | COMPARATIVE EXAMPLE |
| 36 | H | CR | 729 | 1051 | 20 | 44 | 30 | EXAMPLE |
| 37 | H | CR | 712 | 1048 | 23 | 42 | 45 | EXAMPLE |
| 38 | H | CR | 807 | 1025 | 18 | 59 | 48 | EXAMPLE |
| 39 | H | CR | 719 | 980 | 22 | 44 | 42 | EXAMPLE |
| 40 | H | CR | 610 | 765 | 2 | 7 | 7 | COMPARATIVE EXAMPLE |
| 41 | I | CR | 830 | 904 | 26 | 43 | 48 | EXAMPLE |
| 42 | I | CR | 778 | 1014 | 20 | 47 | 28 | EXAMPLE |
| 43 | I | CR | 795 | 911 | 26 | 57 | 26 | EXAMPLE |
| 44 | I | EG | 780 | 994 | 22 | 48 | 43 | EXAMPLE |
| 45 | I | CR | 982 | 1033 | 14 | 51 | 14 | COMPARATIVE EXAMPLE |
| 46 | J | CR | 776 | 1067 | 23 | 40 | 36 | EXAMPLE |
| 47 | J | CR | 695 | 1036 | 23 | 57 | 41 | EXAMPLE |
| 48 | J | CR | 889 | 1063 | 21 | 40 | 41 | EXAMPLE |
| 49 | J | CR | 799 | 1079 | 21 | 41 | 34 | EXAMPLE |
| 50 | J | CR | 616 | 831 | 15 | 16 | 12 | COMPARATIVE EXAMPLE |
| 51 | K | CR | 884 | 1150 | 20 | 47 | 36 | EXAMPLE |
| 52 | K | CR | 988 | 1194 | 18 | 47 | 29 | EXAMPLE |
| 53 | K | CR | 903 | 1126 | 21 | 51 | 44 | EXAMPLE |
| 54 | K | CR | 854 | 1137 | 13 | 33 | 6 | COMPARATIVE EXAMPLE |
| 55 | K | CR | 771 | 1114 | 12 | 32 | 13 | COMPARATIVE EXAMPLE |
| 56 | L | CR | 769 | 1073 | 20 | 39 | 36 | EXAMPLE |
| 57 | L | CR | 611 | 979 | 23 | 56 | 29 | EXAMPLE |
| 58 | L | GA | 596 | 1056 | 20 | 48 | 40 | EXAMPLE |
| 59 | L | CR | 681 | 990 | 16 | 19 | 7 | COMPARATIVE EXAMPLE |
| 60 | L | CR | 540 | 974 | 15 | 15 | 8 | COMPARATIVE EXAMPLE |

TABLE 18

| EXPERIMENTAL EXAMPLE | COLD-ROLLED STEEL SHEET | STEEL TYPE | MATERIAL QUALITY MEASUREMENT RESULT | | | | | |
|---|---|---|---|---|---|---|---|---|
| | | | YS MPa | TS MPa | EL % | λ % | DRAWING VALUE % | |
| 61 | M | CR | 695 | 920 | 21 | 38 | 36 | EXAMPLE |
| 62 | M | CR | 636 | 918 | 26 | 38 | 39 | EXAMPLE |
| 63 | M | CR | 592 | 969 | 22 | 45 | 28 | EXAMPLE |
| 64 | N | CR | 945 | 1346 | 16 | 37 | 43 | EXAMPLE |
| 65 | N | CR | 1092 | 1406 | 14 | 51 | 26 | EXAMPLE |
| 66 | N | CR | 767 | 1338 | 17 | 34 | 40 | EXAMPLE |
| 67 | O | CR | 638 | 1018 | 20 | 47 | 46 | EXAMPLE |
| 68 | O | CR | 632 | 979 | 24 | 35 | 34 | EXAMPLE |
| 69 | O | CR | 646 | 970 | 22 | 51 | 35 | EXAMPLE |
| 70 | P | CR | 1006 | 1323 | 15 | 47 | 44 | EXAMPLE |
| 71 | P | CR | 1247 | 1472 | 13 | 35 | 48 | EXAMPLE |
| 72 | P | GA | 1010 | 1355 | 16 | 50 | 45 | EXAMPLE |
| 73 | Q | CR | 962 | 1094 | 17 | 48 | 48 | EXAMPLE |
| 74 | Q | CR | 760 | 1067 | 18 | 60 | 31 | EXAMPLE |
| 75 | Q | GA | 790 | 1048 | 22 | 45 | 44 | EXAMPLE |
| 76 | R | CR | 764 | 1274 | 16 | 32 | 45 | EXAMPLE |
| 77 | R | CR | 862 | 1265 | 16 | 36 | 35 | EXAMPLE |
| 78 | R | EG | 798 | 1225 | 16 | 42 | 31 | EXAMPLE |
| 79 | S | CR | 1004 | 1082 | 19 | 45 | 36 | EXAMPLE |
| 80 | S | CR | 852 | 1096 | 20 | 54 | 48 | EXAMPLE |
| 81 | S | EG | 938 | 1001 | 22 | 46 | 40 | EXAMPLE |
| 82 | T | CR | 949 | 1022 | 22 | 49 | 37 | EXAMPLE |
| 83 | T | CR | 980 | 1134 | 19 | 50 | 38 | EXAMPLE |
| 84 | T | GI | 929 | 1061 | 17 | 53 | 32 | EXAMPLE |
| 85 | U | CR | 857 | 1091 | 18 | 38 | 43 | EXAMPLE |
| 86 | U | CR | 679 | 1052 | 18 | 44 | 41 | EXAMPLE |
| 87 | U | GI | 698 | 1057 | 19 | 52 | 31 | EXAMPLE |
| 88 | V | CR | 899 | 1173 | 18 | 42 | 46 | EXAMPLE |
| 89 | V | CR | 852 | 1140 | 16 | 47 | 44 | EXAMPLE |
| 90 | V | CR | 652 | 1122 | 19 | 39 | 29 | EXAMPLE |
| 91 | W | CR | 677 | 1066 | 19 | 52 | 29 | EXAMPLE |
| 92 | W | CR | 619 | 1048 | 20 | 52 | 31 | EXAMPLE |
| 93 | W | CR | 735 | 1046 | 18 | 56 | 27 | EXAMPLE |
| 94 | X | CR | 710 | 886 | 23 | 55 | 27 | EXAMPLE |
| 95 | X | CR | 746 | 913 | 25 | 36 | 38 | EXAMPLE |
| 96 | X | CR | 878 | 989 | 22 | 46 | 46 | EXAMPLE |
| 97 | Y | CR | 837 | 1020 | 20 | 45 | 42 | EXAMPLE |
| 98 | Y | CR | 681 | 969 | 20 | 47 | 40 | EXAMPLE |
| 99 | Y | CR | 849 | 1017 | 21 | 39 | 41 | EXAMPLE |
| 100 | Z | CR | 538 | 1015 | 21 | 35 | 37 | EXAMPLE |
| 101 | Z | CR | 562 | 932 | 22 | 48 | 27 | EXAMPLE |
| 102 | Z | CR | 676 | 980 | 22 | 32 | 34 | EXAMPLE |
| 103 | AA | CR | 746 | 1029 | 21 | 42 | 4 | COMPARATIVE EXAMPLE |
| 104 | AB | CR | 557 | 933 | 20 | 52 | 9 | COMPARATIVE EXAMPLE |
| 105 | AC | CR | 687 | 1032 | 20 | 51 | 1 | COMPARATIVE EXAMPLE |
| 106 | AD | CR | 656 | 942 | 25 | 45 | 5 | COMPARATIVE EXAMPLE |
| 107 | AE | CR | 299 | 950 | 22 | 37 | 2 | COMPARATIVE EXAMPLE |
| 108 | AF | CR | 696 | 934 | 25 | 46 | 3 | COMPARATIVE EXAMPLE |

TABLE 19

| EXPERIMENTAL EXAMPLE | COLD-ROLLED STEEL SHEET | STEEL TYPE | MATERIAL QUALITY MEASUREMENT RESULT | | | | | |
|---|---|---|---|---|---|---|---|---|
| | | | YS MPa | TS MPa | EL % | λ % | DRAWING VALUE % | |
| 201 | BA | CR | 633 | 918 | 23 | 52 | 28 | EXAMPLE |
| 202 | BA | GA | 695 | 985 | 23 | 48 | 36 | EXAMPLE |
| 203 | BB | CR | 753 | 1280 | 18 | 35 | 22 | EXAMPLE |
| 204 | BB | GI | 649 | 1064 | 23 | 40 | 35 | EXAMPLE |
| 205 | BC | CR | 737 | 908 | 22 | 42 | 33 | EXAMPLE |
| 206 | BC | EG | 680 | 923 | 24 | 41 | 36 | EXAMPLE |

As shown in Table 16 to Table 19, in all the experimental examples being examples of the present invention out of the experimental examples 1 to 108, 201 to 208, tensile strength was 900 MPa or more and the result of the drawing value was 20% or more and thus was high, and they were excellent in impact resistance.

On the other hand, in the experimental examples being comparative examples out of the experimental examples 1 to 108, tensile strength was less than 900 MPa, and/or the result of the drawing value was low, and they did not have high strength and was not excellent in impact resistance.

Further, the experimental examples 14 and 72 are examples where the coating film made of the composite oxide containing phosphorus is applied on the surface of the galvanized layer, and they have good properties.

The experimental example 5 is an example where the slab heating temperature before the hot rolling is low, and coarse TiN remains and the drawing value at low temperatures is inferior.

The experimental example 10 is an example where the value of (Expression 1) is large, and coarse TiN exists, and the experimental example 59 is an example where the value of (Expression 1) is small, and coarse AlN exists. In the experimental example 10 and the experimental example 59, the drawing value at low temperatures is inferior.

The experimental example 15 is an example where the finish hot-rolling temperature of the hot-rolling is low, and since the microstructures extend in one direction and are uneven, ductility, stretch flangeability, and the drawing value at low temperatures are inferior.

The experimental example 20 is an example where the coiling after the hot rolling is high, and since the microstructures become very coarse, ductility, stretch flangeability, and the drawing value at low temperatures are inferior.

In the experimental example 25, the average cooling rate after the coiling is high, WMnγ/WMn is low, the Mn concentrated to the retained austenite is insufficient, and the drawing value at low temperatures is inferior.

In the experimental example 30, since the reduction ratio of the cold rolling is small and the aspect ratio of the retained austenite (γ aspect ratio) is large, the drawing value at low temperatures is inferior.

In the experimental example 35, since the average heating rate of the annealing is high and the aspect ratio of the retained austenite (γ aspect ratio) is large, the drawing value at low temperatures is inferior.

The experimental example 40 is an example where the maximum heating temperature in the annealing is low, and since it contains many coarse iron-based carbides working as the starting point of destruction, ductility, stretch flangeability, and the drawing value at low temperatures are inferior.

In the experimental example 45, since the cooling rate to 700° C. is excessively high and a sufficient soft structure is not obtained, ductility and the drawing value at low temperatures are inferior.

In the experimental example 50, the cooling rate 1 is excessively low, a coarse carbide is generated, a soft structure is not sufficiently obtained, strength is inferior, and ductility, stretch flangeability, and the drawing value at low temperatures are inferior.

In the experimental example 54, the retention time at 350 to 450° C. is short, an amount of the retained austenite is small, and ductility and the drawing value at low temperatures are inferior.

In the experimental example 55, the retention time at 350 to 450° C. is long, an amount of the retained austenite is small, a coarse carbide is generated, and ductility and the drawing value at low temperature are inferior.

In the experimental example 60, the cooling rate 2 is low, a coarse carbide is generated, and ductility, stretch flangeability, and the drawing value at low temperatures are inferior.

The experimental examples 103 to 108 are examples where the chemical components fall out of the predetermined ranges, and in any of them, a sufficient drawing value at low temperatures is not obtained.

What is claimed is:

1. A high-strength steel sheet containing, in mass %,
C: 0.075 to 0.300%,
Si: 0.30 to 2.50%,
Mn: 1.30 to 3.50%,
P: 0.001 to 0.050%,
S: 0.0001 to 0.0050%,
Al: 0.001 to 0.050%,
Ti: 0.0010 to 0.0150%,
N: 0.0001 to 0.0050%, and
O: 0.0001 to 0.0030%,
with the balance being iron and inevitable impurities, and
having a steel sheet structure wherein a volume fraction of retained austenite is 1 to 8%, an average aspect ratio of the retained austenite is 2.0 or less, and an amount of solid-solution Mn in the retained austenite is at least 1.1 times an average amount of Mn in the steel sheet,
wherein the steel sheet structure comprises TiN grains having an average grain diameter of 0.5 μm or less, and
wherein a density of AlN grains with a grain diameter of 1 μm or more in the steel sheet structure is 1.0 grain/mm$^2$ or less, and
wherein a tensile strength of the steel sheet is 900 MPa or more.

2. The high-strength steel sheet according to claim 1,
wherein: the steel sheet structure further contains, in volume fraction, 10 to 75% ferrite, a total of 10 to 50% of one or both of bainitic ferrite and bainite, combined, and 10 to 50% tempered martensite, and
wherein pearlite is limited to 5% or less in volume fraction, and fresh martensite is limited to 15% or less in volume fraction.

3. The high-strength steel sheet according to claim 1, further containing, in mass %, one or two or more of
Nb: 0.0010 to 0.0150%,
V: 0.010 to 0.150%,
B: 0.0001 to 0.0100%,
Cr: 0.01 to 2.00%,
Ni: 0.01 to 2.00%,
Cu: 0.01 to 2.00%,
Mo: 0.01 to 1.00%, and
W: 0.01 to 1.00%, and/or
in total 0.0001 to 0.5000 mass % of one or two or more of Ca, Ce, Mg, Zr, Hf, and REM.

4. The high-strength galvanized steel according to claim 1, wherein a galvanized layer is formed on a surface.

5. The high-strength galvanized steel sheet according to claim 4, wherein a coating film made of a phosphorus oxide and/or a composite oxide containing phosphorus is formed on the surface of the galvanized layer.

6. A manufacturing method of the high-strength steel sheet of claim 1, the method comprising:
a hot-rolling step in which a slab containing, in mass %,
C: 0.075 to 0.300%,
Si: 0.30 to 2.50%,
Mn: 1.30 to 3.50%,
P: 0.001 to 0.050%, S: 0.0001 to 0.0050%,
Al: 0.001 to 0.050%,
Ti: 0.0010 to 0.0150%,
N: 0.0001 to 0.0050%, and
O: 0.0001 to 0.0030%, with the balance being iron and inevitable impurities is heated to 1210° C. or higher, reduction is performed under a condition satisfying the following (Expression 1) at least in a temperature range of 1100 to 1000° C., the reduction is finished at a finish hot-rolling temperature that is not lower than a higher temperature of 800° C. and an Ar$_3$ transformation point nor higher than 970° C., coiling is performed in a temperature region of 750° C. or lower, and cooling is performed at an average cooling rate of 15° C./hour or less;

a cold-rolling step in which cold-rolling is performed at a reduction ratio of 30 to 75% after the hot-rolling step; and a continuous annealing step of performing, after the cold-rolling step, annealing where heating is performed in a temperature range of 550 to 700° C. at an average heating rate of 10° C./second or less, a maximum heating temperature is set to a temperature between (an Act transformation point+40) and 1000° C., cooling is performed in a temperature range of the maximum heating temperature to 700° C. at an average cooling rate of 1.0 to 10.0° C./second, cooling is performed in a temperature range of 700 to 500° C. at an average cooling rate of 5.0 to 200.0° C./second, and a retention process is performed in a temperature range of 350 to 450° C. for 30 to 1000 seconds, $$1.0 \leq \left\{ \sum_{i=1}^{n} \left[ \left\{ \frac{-97.2 + 5.47 \cdot (T_{i+1} + T_i)^{1/2} -}{0.067 \cdot (T_{i+1} + T_i)} \right\}^2 \cdot \exp\left(-\frac{20800}{T_{i+1} + T_i}\right) \cdot t_i \cdot \varepsilon_i^{1/2} \right]^{1/2} \right\} \leq 5.0 \quad \text{(Expression 1)}$$

wherein in (Expression 1), i represents the number of passes, $T_i$ represents a working temperature of the $i^{th}$ pass, $t_i$ represents an elapsed time from the $i^{th}$ pass to the $i+1^{th}$ pass, and $\varepsilon_i$ represents a reduction ratio of the $i^{th}$ pass.

7. A method of manufacturing a high-strength galvanized steel sheet, wherein, in the continuous annealing step of the manufacturing method according to claim 6, a galvanized layer is formed on a surface of the steel sheet by applying electrogalvanization after the retention process.

8. A manufacturing method of a high-strength galvanized steel sheet, wherein, in the continuous annealing step of the manufacturing method according to claim 6, after the cooling in the temperature range of 700 to 500° C., the steel sheet is immersed in a galvanizing bath to form a galvanized layer on a surface of the steel sheet before the retention process in the temperature range of 350 to 450° C. or after the retention process.

9. The manufacturing method of the high-strength galvanized steel sheet according to claim 8, wherein, after being immersed in the galvanizing bath, the steel sheet is re-heated to 460 to 600° C. and is retained for two seconds or longer to alloy the galvanized layer.

10. The manufacturing method of the high-strength galvanized steel sheet according to claim 8, wherein, after the galvanized layer is formed, a coating film made of a phosphorus oxide and/or a composite oxide containing phosphorus is applied on a surface of the galvanized layer.

11. The manufacturing method of the high-strength galvanized steel sheet according to claim 9, wherein, after the galvanized layer is alloyed, a coating film made of a phosphorus oxide and/or a composite oxide containing phosphorus is applied on a surface of the alloyed galvanized layer.

12. A method of manufacturing a high-strength galvanized steel sheet according to claim 6, wherein the slab further comprises, in mass %,
one or two or more of
Nb: 0.0010 to 0.0150%,
V: 0.010 to 0.150%,
B: 0.0001 to 0.0100%,
Cr: 0.01 to 2.00%,
Ni: 0.01 to 2.00%,
Cu: 0.01 to 2.00%,
Mo: 0.01 to 1.00%, and
W: 0.01 to 1.00%, and/or
in total 0.0001 to 0.5000 mass % of one or two or more of Ca, Ce, Mg, Zr, Hf, and REM.

* * * * *